(12) United States Patent
Suzuki et al.

(10) Patent No.: US 10,408,488 B2
(45) Date of Patent: Sep. 10, 2019

(54) REFRIGERATION CYCLE APPARATUS AND REFRIGERATION CYCLE SYSTEM

(71) Applicant: Mitsubishi Electric Corporation, Tokyo (JP)

(72) Inventors: Yasuhiro Suzuki, Tokyo (JP); Masahiko Takagi, Tokyo (JP); Kenyu Tanaka, Tokyo (JP); Yohei Suzuki, Tokyo (JP); Kenta Nomura, Tokyo (JP); Kazuki Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 15/740,203

(22) PCT Filed: Apr. 26, 2016

(86) PCT No.: PCT/JP2016/063108
§ 371 (c)(1),
(2) Date: Dec. 27, 2017

(87) PCT Pub. No.: WO2017/026147
PCT Pub. Date: Feb. 16, 2017

(65) Prior Publication Data
US 2018/0187917 A1    Jul. 5, 2018

(30) Foreign Application Priority Data

Aug. 7, 2015  (WO) .................. PCT/JP2015/072554

(51) Int. Cl.
*F24F 11/89*    (2018.01)
*F24F 11/36*    (2018.01)
(Continued)

(52) U.S. Cl.
CPC .............. *F24F 11/89* (2018.01); *F24F 11/36* (2018.01); *F25B 49/005* (2013.01); *F25B 49/02* (2013.01);
(Continued)

(58) Field of Classification Search
CPC .. F24F 11/32; F24F 11/36; F24F 11/38; F24F 11/89; F24F 2110/50; F25B 2600/05;
(Continued)

(56) References Cited

U.S. PATENT DOCUMENTS 5,729,207 A    3/1998   Yamano
5,737,931 A *  4/1998   Ueno .................... F25B 9/006
                                                         62/126
(Continued)

FOREIGN PATENT DOCUMENTS

JP    05187683 A      7/1993
JP    07-117328 B2   12/1995
(Continued)

OTHER PUBLICATIONS

International Search Report of the International Searching Authority dated Jul. 12, 2016 for the corresponding international application No. PCT/JP2016/063108 (and English translation).

*Primary Examiner* — Jianying C Atkisson
*Assistant Examiner* — Meraj A Shaikh
(74) *Attorney, Agent, or Firm* — Posz Law Group, PLC

(57) ABSTRACT

A refrigeration cycle apparatus includes a refrigerant circuit configured to circulate refrigerant, a heat exchanger unit accommodating a heat exchanger of the refrigerant circuit, and a controller configured to control the heat exchanger unit. The heat exchanger unit includes an air-sending fan, an electric refrigerant detection unit, and a notifier configured to output notification of an abnormality. The controller is configured to stop electric supply to the electric refrigerant (Continued)

detection unit when an electric supply stop condition is satisfied under a state in which the electric refrigerant detection unit is supplied with electricity, supply electricity to the electric refrigerant detection unit when an electric supply condition is satisfied under a state in which the electric supply to the electric refrigerant detection unit is stopped, and cause the notifier to output the notification of the abnormality when an integrated time of electric supply to the electric refrigerant detection unit becomes equal to or larger than a threshold time.

28 Claims, 9 Drawing Sheets

(51) Int. Cl.
*F25B 49/00* (2006.01)
*F25B 49/02* (2006.01)
*F24F 110/10* (2018.01)

(52) U.S. Cl.
CPC ......... *F25B 49/022* (2013.01); *F24F 2110/10* (2018.01); *F25B 2500/222* (2013.01)

(58) Field of Classification Search
CPC ............. F25B 2600/07; F25B 2600/11; F25B 2600/23; F25B 2700/17; F25B 2500/222
See application file for complete search history.

(56) References Cited

U.S. PATENT DOCUMENTS

| | | | |
|---|---|---|---|
| 6,761,629 B1 * | 7/2004 | Parker | F01D 11/00 114/211 |
| 2002/0178738 A1 | 12/2002 | Taira et al. | |
| 2009/0107157 A1 * | 4/2009 | Dube | F25B 49/005 62/149 |
| 2016/0183408 A1 * | 6/2016 | Sutherland | F25D 17/02 62/93 |
| 2017/0002719 A1 * | 1/2017 | Dudar | F01P 1/06 |
| 2018/0094822 A1 * | 4/2018 | Tada | F24F 13/24 |

FOREIGN PATENT DOCUMENTS

| | | | |
|---|---|---|---|
| JP | 08-226746 A | | 9/1996 |
| JP | 08327195 A | * | 12/1996 |
| JP | 09-180080 A | | 7/1997 |
| JP | 11-037619 A | | 2/1999 |
| JP | 2005-144955 A | | 6/2005 |
| JP | 2005-291702 A | | 10/2005 |
| JP | 2006-145053 A | | 6/2006 |
| JP | 2008-171160 A | | 7/2008 |
| JP | 4599699 B2 | | 10/2010 |
| JP | 2014-224612 A | | 12/2014 |
| JP | 2015-117931 A | | 6/2015 |

* cited by examiner

REFRIGERATION CYCLE APPARATUS AND REFRIGERATION CYCLE SYSTEM

CROSS REFERENCE TO RELATED APPLICATION

This application is a U.S. national stage application of International Application No. PCT/JP2016/063 108, filed on Apr. 26, 2016, and claims priority from International Application No. PCT/JP2015/072554, filed on Aug. 7, 2015, the contents of which are incorporated herein by reference.

TECHNICAL FIELD

The present invention relates to a refrigeration cycle apparatus and a refrigeration cycle system that include a refrigerant detection unit.

BACKGROUND ART

In Patent Literature 1, there is disclosed an air-conditioning apparatus. The air-conditioning apparatus includes a gas sensor provided on an outer surface of an indoor unit and configured to detect refrigerant, and a controller configured to control an indoor air-sending fan to rotate when the gas sensor detects the refrigerant. The air-conditioning apparatus can detect leaked refrigerant by the gas sensor when the refrigerant leaks to an indoor space through an extension pipe connected to the indoor unit or when refrigerant leaked inside the indoor unit passes through a gap of a casing of the indoor unit to flow outside of the indoor unit. Further, the indoor air-sending fan is rotated when the leakage of the refrigerant is detected so that indoor air is sucked through an air inlet formed in the casing of the indoor unit and air is blown off to the indoor space through an air outlet. In this manner, the leaked refrigerant can be diffused.

CITATION LIST

Patent Literature

Patent Literature 1: Japanese Patent No. 4599699

SUMMARY OF INVENTION

Technical Problem

When an electric supply gas sensor, for example, a semiconductor gas sensor that serves as a refrigerant detection unit, in an electricity supplied state, is exposed to a gas to be detected or miscellaneous gases other than the gas to be detected for a long period of time, the detection characteristics may be changed. When the electric supply gas sensor whose detection characteristics have been changed is kept in continuous use, there has been a problem of a risk of delay in detection of leakage of refrigerant when the leakage occurs or false detection in which leakage is detected when the refrigerant has not leaked. In particular, when the above-mentioned delay in detection of leakage occurs, the indoor air-sending fan cannot be rotated even when the refrigerant has leaked, and hence there is a risk that the indoor refrigerant concentration may be locally increased.

The present invention has been made to solve the above-mentioned problems, and has an object to provide a refrigeration cycle apparatus and a refrigeration cycle system that are capable of preventing a refrigerant detection unit whose detection characteristics have been changed from being kept in continuous use.

Solution to Problem

According to one embodiment of the present invention, there is provided a refrigeration cycle apparatus including a refrigerant circuit configured to circulate refrigerant, a heat exchanger unit accommodating a heat exchanger of the refrigerant circuit, and a controller configured to control the heat exchanger unit. The heat exchanger unit includes an air-sending fan, an electric refrigerant detection unit, and a notifier configured to output notification of an abnormality. The controller is configured to stop electric supply to the electric refrigerant detection unit when an electric supply stop condition is satisfied under a state in which the electric refrigerant detection unit is supplied with electricity, supply electricity to the electric refrigerant detection unit when an electric supply condition is satisfied under a state in which the electric supply to the electric refrigerant detection unit is stopped, and cause the notifier to output the notification of the abnormality when an integrated time of electric supply to the electric refrigerant detection unit becomes equal to or larger than a first threshold time.

According to one embodiment of the present invention, there is provided a refrigeration cycle system including a refrigeration cycle apparatus including a refrigerant circuit configured to circulate refrigerant, a controller configured to control the refrigerant circuit, and a notifier configured to output notification of an abnormality, and an electric refrigerant detection unit, the electric refrigerant detection unit being configured to output a detection signal to the controller. The controller is configured to stop electric supply to the electric refrigerant detection unit when an electric supply stop condition is satisfied under a state in which the electric refrigerant detection unit is supplied with electricity, supply electricity to the electric refrigerant detection unit when an electric supply condition is satisfied under a state in which the electric supply to the electric refrigerant detection unit is stopped, and cause the notifier to output the notification of the abnormality when an integrated time of electric supply to the electric refrigerant detection unit becomes equal to or larger than a first threshold time.

Advantageous Effects of Invention

According to one embodiment of the present invention, the notifier outputs the notification of the abnormality when the integrated time of electric supply to the refrigerant detection unit becomes equal to or larger than the threshold time, and hence the refrigerant detection unit whose detection characteristics have been changed can be prevented from being kept in continuous use.

DESCRIPTION OF EMBODIMENTS

First Embodiment

Figure 1:
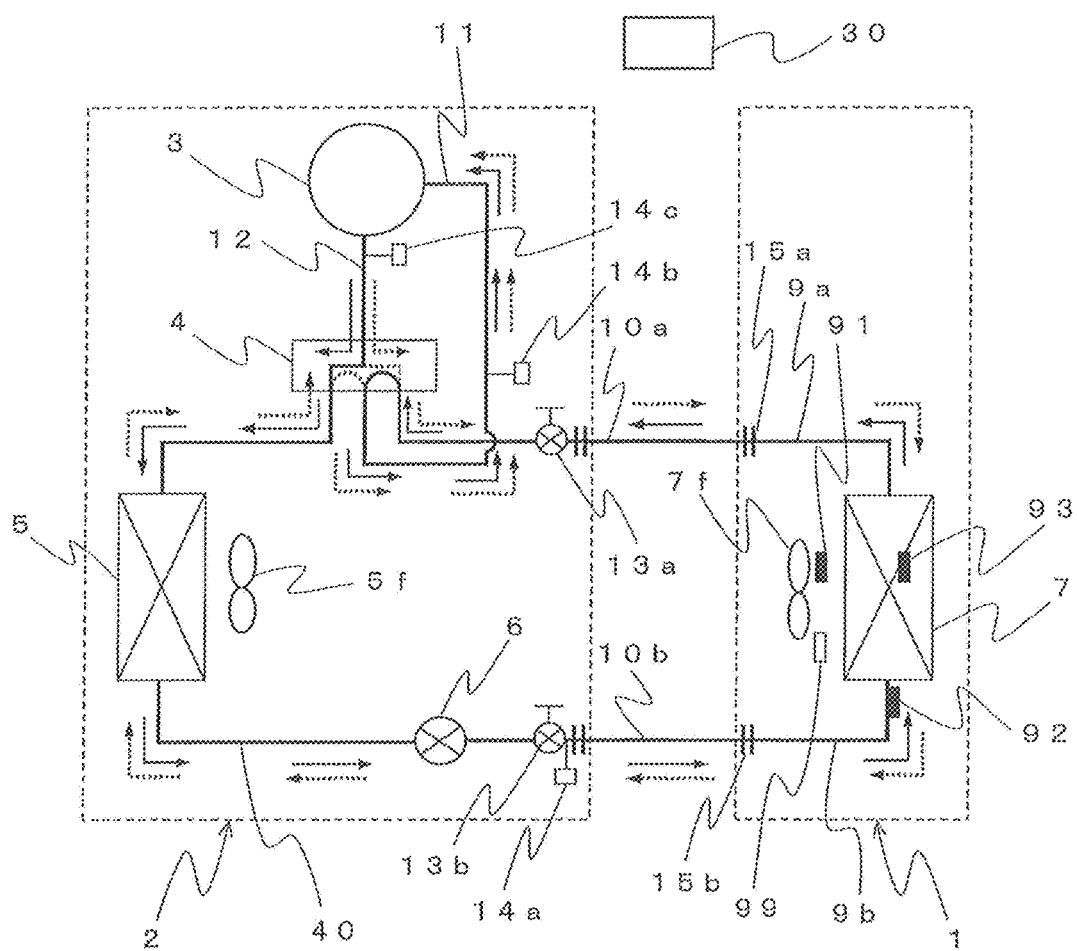
FIG. 1 is a refrigerant circuit diagram for illustrating a schematic configuration of an air-conditioning apparatus according to a first embodiment of the present invention.

A refrigeration cycle apparatus according to a first embodiment of the present invention is described. In the first embodiment, an air-conditioning apparatus is exemplified as the refrigeration cycle apparatus. FIG. 1 is a refrigerant circuit diagram for illustrating a schematic configuration of the air-conditioning apparatus according to the first embodiment. In FIG. 1 and the subsequent figures, components may have a dimensional relationship, shapes, and other aspects that are different from actual ones.

As illustrated in FIG. 1, the air-conditioning apparatus includes a refrigerant circuit 40 configured to circulate refrigerant. The refrigerant circuit 40 includes a compressor 3, a refrigerant flow switching device 4, a heat source-side heat exchanger 5 (for example, outdoor heat exchanger), a pressure reducing device 6, and a load-side heat exchanger 7 (for example, indoor heat exchanger), which are annularly connected in order through refrigerant pipes. Further, the air-conditioning apparatus includes an outdoor unit 2, which is installed, for example, outdoors as a heat source unit. Further, the air-conditioning apparatus includes an indoor unit 1 (example of a heat exchanger unit), which is installed, for example, indoors as a load unit. The indoor unit 1 and the outdoor unit 2 are connected to each other through extension pipes 10$a$ and 10$b$ forming parts of the refrigerant pipes.

Examples of a refrigerant used as the refrigerant to be circulated by the refrigerant circuit 40 include a slightly flammable refrigerant, such as HFO-1234yf and HFO-1234ze and a strongly flammable refrigerant, such as R290 and R1270. These refrigerants may be each used as a single component refrigerant, or may be used as a mixed refrigerant obtained by mixing two or more kinds of the refrigerants with each other. In the following description, the refrigerant having a flammability equal to or higher than a slightly flammable level (for example, 2 L or higher in category of ASHRAE 34) is sometimes referred to as "flammable refrigerant". Further, as the refrigerant to be circulated by the refrigerant circuit 40, a nonflammable refrigerant, such as R22 and R410A, having a nonflammability (for example, 1 in category of ASHRAE 34) can be used. These refrigerants have a density larger than that of air under, for example, an atmospheric pressure.

The compressor 3 is a fluid machine configured to compress sucked low-pressure refrigerant and to discharge the refrigerant as high-pressure refrigerant. The refrigerant flow switching device 4 is configured to switch a flow direction of the refrigerant in the refrigerant circuit 40 between a cooling operation time and a heating operation time. As the refrigerant flow switching device 4, for example, a four-way valve is used. The heat source-side heat exchanger 5 is a heat exchanger configured to act as a radiator (for example, condenser) at the cooling operation time and to act as an evaporator at the heating operation time. In the heat source-side heat exchanger 5, heat is exchanged between the refrigerant circulated through an inside of the heat source-side heat exchanger 5 and outdoor air sent by an outdoor air-sending fan 5$f$ described later. The pressure reducing device 6 is configured to reduce the pressure of the high-pressure refrigerant so that the high-pressure refrigerant becomes the low-pressure refrigerant. As the pressure reducing device 6, for example, an electronic expansion valve capable of adjusting its opening degree is used. The load-side heat exchanger 7 is a heat exchanger configured to act as an evaporator at the cooling operation time and to act as a radiator (for example, condenser) at the heating operation time. In the load-side heat exchanger 7, heat is exchanged between the refrigerant circulated through an inside of the load-side heat exchanger 7 and air sent by an indoor air-sending fan 7$f$ described later. In this case, the cooling operation represents an operation for supplying low-temperature and low-pressure refrigerant to the load-side heat exchanger 7, and the heating operation represents an operation for supplying high-temperature and high-pressure refrigerant to the load-side heat exchanger 7.

The outdoor unit 2 accommodates the compressor 3, the refrigerant flow switching device 4, the heat source-side heat exchanger 5, and the pressure reducing device 6. Further, the outdoor unit 2 accommodates the outdoor air-sending fan 5$f$ configured to supply outdoor air to the heat source-side heat exchanger 5. The outdoor air-sending fan 5$f$ is installed to be opposed to the heat source-side heat exchanger 5. When the outdoor air-sending fan 5$f$ is rotated, an airflow passing through the heat source-side heat exchanger 5 is generated. As the outdoor air-sending fan 5$f$, for example, a propeller fan is used. The outdoor air-sending fan 5$f$ is arranged, for example, downstream of the heat source-side heat exchanger 5 along the airflow generated by the outdoor air-sending fan 5$f$.

The refrigerant pipes arranged in the outdoor unit 2 include a refrigerant pipe connecting between an extension pipe connection valve 13$a$ on the gas side at the cooling operation time and the refrigerant flow switching device 4, a suction pipe 11 connected to a suction side of the compressor 3, a discharge pipe 12 connected to a discharge side of the compressor 3, a refrigerant pipe connecting between the refrigerant flow switching device 4 and the heat source-side heat exchanger 5, a refrigerant pipe connecting between the heat source-side heat exchanger 5 and the pressure reducing device 6, and a refrigerant pipe connecting between an extension pipe connection valve 13b on the liquid side at the cooling operation time and the pressure reducing device 6. The extension pipe connection valve 13a is formed of a two-way valve capable of switching between open and close, and has one end to which a flare joint is mounted. Further, the extension pipe connection valve 13b is formed of a three-way valve capable of switching between open and close. The extension pipe connection valve 13b has one end to which a service port 14a is mounted, and another end to which a flare joint is mounted. The service port 14a is used at a time of vacuuming, which is a preliminary work of filling the refrigerant circuit 40 with refrigerant.

At both the cooling operation time and the heating operation time, high-temperature and high-pressure gas refrigerant compressed by the compressor 3 flows through the discharge pipe 12. At both the cooling operation time and the heating operation time, low-temperature and low-pressure gas refrigerant or two-phase refrigerant subjected to an evaporation action flows through the suction pipe 11. The suction pipe 11 is connected to a low-pressure-side service port 14b with a flare joint, and the discharge pipe 12 is connected to a high-pressure-side service port 14c with a flare joint. The service ports 14b and 14c are used to connect a pressure gauge to measure the operating pressure at a time of installation of the air-conditioning apparatus or at a time of a trial run for a repair.

The indoor unit 1 accommodates the load-side heat exchanger 7. Further, the indoor air-sending fan 7f configured to supply air to the load-side heat exchanger 7 is installed in the indoor unit 1. When the indoor air-sending fan 7f is rotated, an airflow passing through the load-side heat exchanger 7 is generated. As the indoor air-sending fan 7f, a centrifugal fan (for example, sirocco fan or turbofan), a cross flow fan, a mixed flow fan, an axial fan (for example, propeller fan), or other fans is used depending on a configuration of the indoor unit 1. The indoor air-sending fan 7f of the first embodiment is arranged upstream of the load-side heat exchanger 7 along the airflow generated by the indoor air-sending fan 7f, but may be arranged downstream of the load-side heat exchanger 7.

Of the refrigerant pipes of the indoor unit 1, a gas-side indoor pipe 9a is provided in a connection portion to the gas-side extension pipe 10a with a joint portion 15a (for example, flare joint) for connection to the extension pipe 10a. Further, of the refrigerant pipes of the indoor unit 1, a liquid-side indoor pipe 9b is provided in a connection portion to the liquid-side extension pipe 10b with a joint portion 15b (for example, flare joint) for connection to the extension pipe 10b.

Further, the indoor unit 1 includes a suction air temperature sensor 91 configured to measure a temperature of indoor air sucked from the indoors, a heat exchanger entrance temperature sensor 92 configured to measure a refrigerant temperature in a cooling operation time entrance portion (heating operation time exit portion) of the load-side heat exchanger 7, and a heat exchanger temperature sensor 93 configured to measure a refrigerant temperature (evaporating temperature or condensing temperature) of a two-phase portion of the load-side heat exchanger 7. In addition, the indoor unit 1 includes a refrigerant detection unit 99 (for example, semiconductor gas sensor) described later. These sensors are configured to output a detection signal to a controller 30 configured to control an entirety of the indoor unit 1 or the air-conditioning apparatus.

The controller 30 includes a microcomputer including a CPU, a ROM, a RAM, an input-output port, and a timer. The controller 30 can conduct data communications with an operation unit 26 (see FIG. 2). The operation unit 26 is configured to receive an operation performed by a user to output an operation signal based on the operation to the controller 30. The controller 30 of the first embodiment is configured to control the operation of the entirety of the indoor unit 1 or the air-conditioning apparatus including an operation of the indoor air-sending fan 7f on the basis of an operation signal received from the operation unit 26, the detection signal received from the sensors, or other signals. Further, the controller 30 of the first embodiment can conduct switching between electric supply and non-electric supply to the refrigerant detection unit 99. The controller 30 may be provided inside a casing of the indoor unit 1, or may be provided inside a casing of the outdoor unit 2. Further, the controller 30 may include an outdoor unit controller provided to the outdoor unit 2 and an indoor unit controller that is provided to the indoor unit 1 and capable of conducting data communications with the outdoor unit controller.

Next, a description is made of the operation of the refrigerant circuit 40 of the air-conditioning apparatus. First, the operation at the cooling operation time is described. In FIG. 1, the solid arrows indicate flow directions of the refrigerant at the cooling operation time. The refrigerant circuit 40 is configured such that, in the cooling operation, a refrigerant flow passage is switched by the refrigerant flow switching device 4 as indicated by the solid line, and the low-temperature and low-pressure refrigerant flows into the load-side heat exchanger 7.

The high-temperature and high-pressure gas refrigerant discharged from the compressor 3 first flows into the heat source-side heat exchanger 5 after passing through the refrigerant flow switching device 4. In the cooling operation, the heat source-side heat exchanger 5 acts as a condenser. That is, in the heat source-side heat exchanger 5, heat is exchanged between the refrigerant circulated through the inside and the outdoor air sent by the outdoor air-sending fan 5f, and heat of condensation of the refrigerant is transferred to the outdoor air. With this operation, the refrigerant that has flowed into the heat source-side heat exchanger 5 is condensed to become high-pressure liquid refrigerant. The high-pressure liquid refrigerant flows into the pressure reducing device 6, and has the pressure reduced to become low-pressure two-phase refrigerant. The low-pressure two-phase refrigerant passes through the extension pipe 10b, and flows into the load-side heat exchanger 7 of the indoor unit 1. In the cooling operation, the load-side heat exchanger 7 acts as an evaporator. That is, in the load-side heat exchanger 7, heat is exchanged between the refrigerant circulated through the inside and the air (for example, indoor air) sent by the indoor air-sending fan 7f, and heat of evaporation of the refrigerant is received from the sent air. With this operation, the refrigerant that has flowed into the load-side heat exchanger 7 evaporates to become low-pressure gas refrigerant or two-phase refrigerant. Further, the air sent by the indoor air-sending fan 7f is cooled by a heat receiving action of the refrigerant. The low-pressure gas refrigerant or two-phase refrigerant evaporated by the load-side heat exchanger 7 passes through the extension pipe 10a and the refrigerant flow switching device 4, and is sucked by the compressor 3. The refrigerant sucked by the compressor 3 is compressed to become the high-temperature and high-pressure gas refrigerant. In the cooling operation, the above-mentioned cycle is repeated.

Next, the operation at the heating operation time is described. In FIG. 1, the dotted arrows indicate flow directions of the refrigerant at the heating operation time. The refrigerant circuit 40 is configured such that, in the heating operation, the refrigerant flow passage is switched by the refrigerant flow switching device 4 as indicated by the dotted line, and the high-temperature and high-pressure refrigerant flows into the load-side heat exchanger 7. At the heating operation time, the refrigerant flows in a direction reverse to that of the cooling operation time, and the load-side heat exchanger 7 acts as a condenser. That is, in the load-side heat exchanger 7, heat is exchanged between the refrigerant circulated through the inside and the air sent by the indoor air-sending fan 7f, and the heat of condensation of the refrigerant is transferred to the sent air. With this operation, the air sent by the indoor air-sending fan 7f is heated by a heat transferring action of the refrigerant.

Figure 2:
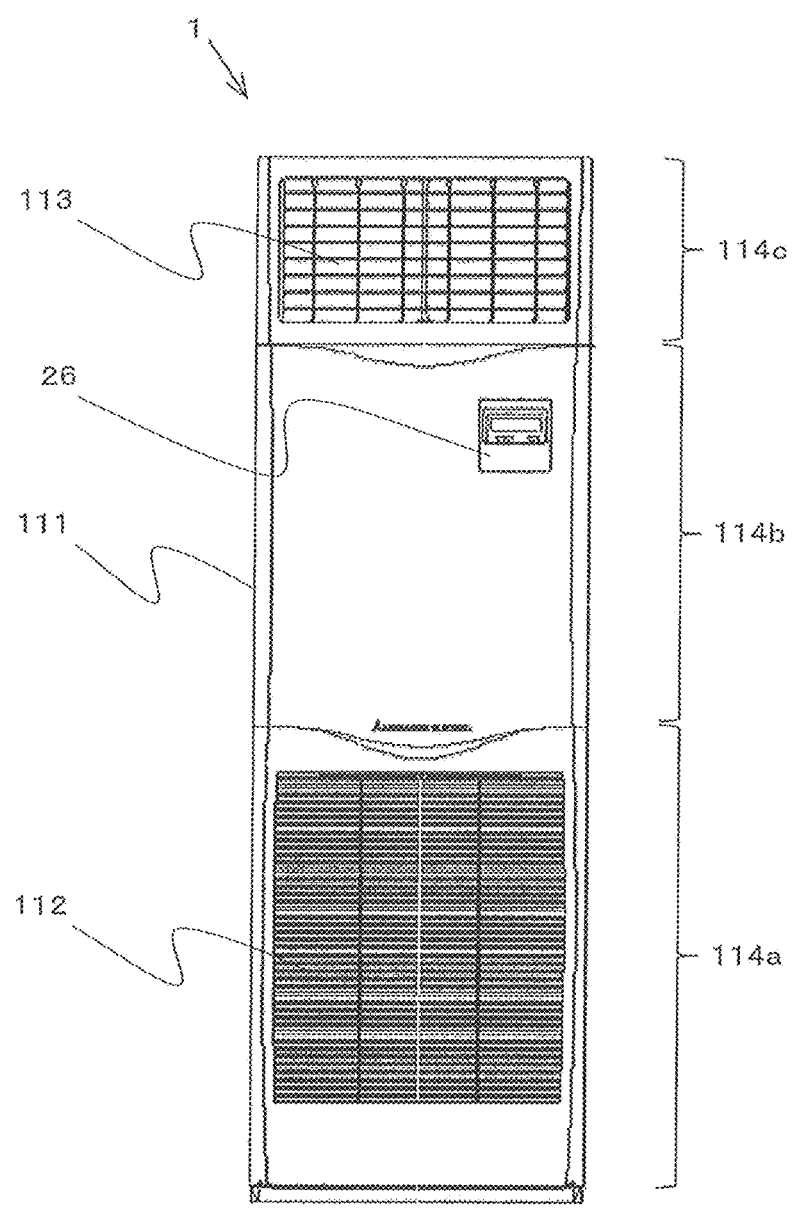
FIG. 2 is a front view for illustrating a configuration of an outer appearance of an indoor unit 1 of the air-conditioning apparatus according to the first embodiment of the present invention.
Figure 3:
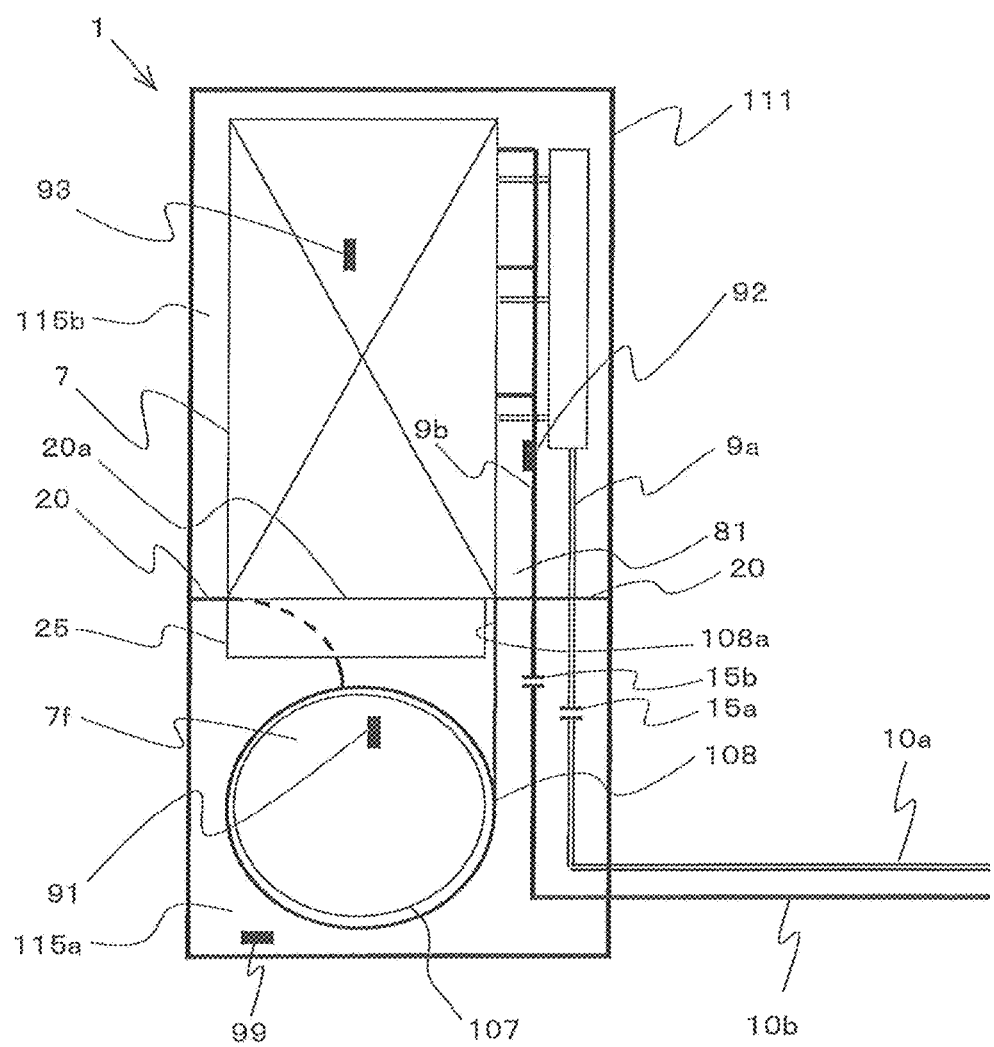
FIG. 3 is a front view for schematically illustrating an internal structure of the indoor unit 1 of the air-conditioning apparatus according to the first embodiment of the present invention.
Figure 4:
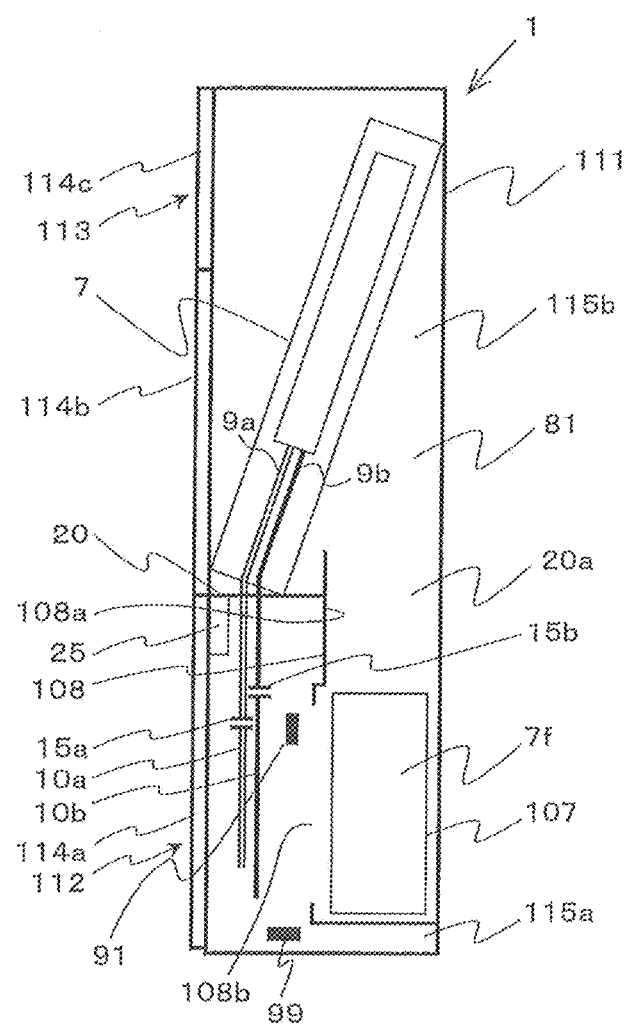
FIG. 4 is a side view for schematically illustrating the internal structure of the indoor unit 1 of the air-conditioning apparatus according to the first embodiment of the present invention.

FIG. 2 is a front view for illustrating a configuration of an outer appearance of the indoor unit 1 of the air-conditioning apparatus according to the first embodiment. FIG. 3 is a front view for schematically illustrating an internal structure of the indoor unit 1. FIG. 4 is a side view for schematically illustrating the internal structure of the indoor unit 1. The left of FIG. 4 indicates a front surface side (indoor space side) of the indoor unit 1. In the first embodiment, as the indoor unit 1, the indoor unit 1 of a floor type, which is installed on a floor surface of an indoor space that is an air-conditioned space, is described as an example. In the following description, positional relationships (for example, top-bottom relationship) between components are, in principle, exhibited when the indoor unit 1 is installed in a usable state.

As illustrated in FIG. 2 to FIG. 4, the indoor unit 1 includes a casing 111 having an upright rectangular parallelepiped shape. An air inlet 112 configured to suck air inside the indoor space is formed in a lower portion of a front surface of the casing 111. The air inlet 112 of the first embodiment is provided in a position proximate to the floor surface and below a center portion of the casing 111 along a vertical direction. An air outlet 113 configured to blow off the air sucked from the air inlet 112 indoors is formed in the upper portion of the front surface of the casing 111, that is, in a position higher than the air inlet 112 (for example, above the center portion of the casing 111 along the vertical direction). The operation unit 26 is provided to the front surface of the casing 111, above the air inlet 112, and below the air outlet 113. The operation unit 26 is connected to the controller 30 through a communication line, and is capable of conducting mutual data communications with the controller 30. In the operation unit 26, an operation start operation, an operation end operation, switching of an operation mode, setting of a set temperature and a set airflow rate, and other operations are conducted for the air-conditioning apparatus in accordance with user's operations. The operation unit 26 includes a display unit or an audio output unit as a notifier configured to output the notification of information.

The casing 111 is a hollow box body, and a front opening part is formed on a front surface of the casing 111. The casing 111 includes a first front panel 114a, a second front panel 114b, and a third front panel 114c, which are removably mounted to the front opening part. The first front panel 114a, the second front panel 114b, and the third front panel 114c all have a substantially rectangular flat outer shape. The first front panel 114a is removably mounted to a lower part of the front opening part of the casing 111. In the first front panel 114a, the air inlet 112 described above is formed. The second front panel 114b is arranged immediately above the first front panel 114a, and is removably mounted to a center part of the front opening part of the casing 111 along the vertical direction. In the second front panel 114b, the operation unit 26 described above is provided. The third front panel 114c is arranged immediately above the second front panel 114b, and is removably mounted to an upper part of the front opening part of the casing 111. In the third front panel 114c, the air outlet 113 described above is formed.

An internal space of the casing 111 is roughly divided into a space 115a being an air-sending part and a space 115b being a heat-exchanging part located above the space 115a. The space 115a and the space 115b are partitioned by a partition portion 20. The partition portion 20 has, for example, a flat shape, and is arranged approximately horizontally. In the partition portion 20, at least an air passage opening part 20a is formed to serve as an air passage between the space 115a and the space 115b. The space 115a is defined to be exposed to the front surface side when the first front panel 114a is removed from the casing 111, and the space 115b is defined to be exposed to the front surface side when the second front panel 114b and the third front panel 114c are removed from the casing 111. That is, the partition portion 20 is mounted at approximately the same height as a height of an upper edge of the first front panel 114a or a lower edge of the second front panel 114b. In this case, the partition portion 20 may be formed integrally with a fan casing 108 described later, may be formed integrally with a drain pan described later, or may be formed separately from the fan casing 108 or the drain pan.

In the space 115a, the indoor air-sending fan 7f, which is configured to cause a flow of air from the air inlet 112 to the air outlet 113 in the air passage 81 of the casing 111, is arranged. The indoor air-sending fan 7f of the first embodiment is a sirocco fan including a motor (not shown) and an impeller 107 that is connected to an output shaft of the motor and has a plurality of blades arranged, for example, at regular intervals along a circumferential direction. A rotary shaft of the impeller 107 is arranged substantially in parallel with a depth direction of the casing 111. The rotation speed of the indoor air-sending fan 7f is controlled by the controller 30 on the basis of a set airflow rate or other conditions set by the user to be variably set at multiple stages (for example, two stages or more) or continuously.

The impeller 107 of the indoor air-sending fan 7f is covered with the fan casing 108 having a spiral shape. The fan casing 108 is formed, for example, separately from the casing 111. A suction opening part 108b for sucking the indoor air through the air inlet 112 into the fan casing 108 is formed close to the center of a spiral of the fan casing 108. The suction opening part 108b is located to be opposed to the air inlet 112. Further, an air outlet opening part 108a for blowing off the sent air is formed along a direction of a tangential line of the spiral of the fan casing 108. The air outlet opening part 108a is located to be directed upward, and is connected to the space 115b through the air passage opening part 20a of the partition portion 20. In other words, the air outlet opening part 108a communicates to the space 115b through the air passage opening part 20a. An opening end of the air outlet opening part 108a and an opening end of the air passage opening part 20a may be directly linked to each other, or may be indirectly linked to each other through a duct member or other members.

Further, in the space 115a, there is provided an electric component box 25 accommodating, for example, a microcomputer that forms the controller 30, different kinds of electrical components, and a substrate.

The load-side heat exchanger 7 is arranged in the air passage 81 in the space 115b. The drain pan (not shown) configured to receive condensed water that is condensed on a surface of the load-side heat exchanger 7 is provided below the load-side heat exchanger 7. The drain pan may be formed as a part of the partition portion 20, or may be formed separately from the partition portion 20 to be arranged on the partition portion 20.

The refrigerant detection unit 99 is provided in a position close to and below the space 115a. As the refrigerant detection unit 99, an electric supply-type refrigerant detection unit including an electric supply gas sensor, for example, a semiconductor gas sensor or a hot-wire type semiconductor gas sensor, is used. The refrigerant detection unit 99 is configured to detect, for example, a refrigerant concentration in the air around the refrigerant detection unit 99, and to output the detection signal to the controller 30. The controller 30 determines presence or absence of leakage of the refrigerant on the basis of the detection signal received from the refrigerant detection unit 99.

In the indoor unit 1, a brazed portion of the load-side heat exchanger 7 and the joint portions 15a and 15b are liable to leak the refrigerant. Further, the refrigerant used in the first embodiment has a density larger than that of the air under the atmospheric pressure. Hence, the refrigerant detection unit 99 of the first embodiment is provided in a position lower in height than the load-side heat exchanger 7 and the joint portions 15a and 15b in the casing 111. With this arrangement, the refrigerant detection unit 99 can reliably detect the leaked refrigerant at least when the indoor air-sending fan 7f is stopped. In the first embodiment, the refrigerant detection unit 99 is provided in a lower part of the space 115a, but an arrangement position of the refrigerant detection unit 99 may be another position.

Figure 5:
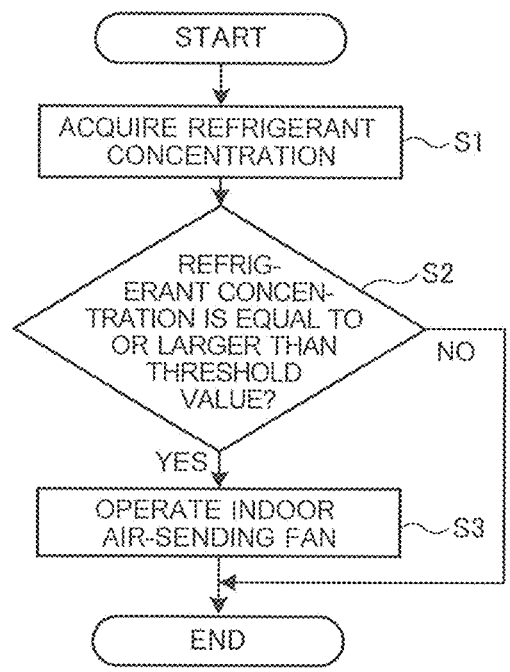
FIG. 5 is a flowchart for illustrating an example of refrigerant leakage detection processing executed by a controller 30 of the air-conditioning apparatus according to the first embodiment of the present invention.

FIG. 5 is a flowchart for illustrating an example of the flow of the refrigerant leakage detection processing executed by the controller 30 of the air-conditioning apparatus according to the first embodiment. The refrigerant leakage detection processing is executed repeatedly with a predetermined time interval at normal time including time when the air-conditioning apparatus is operating and is stopped, only time when the air-conditioning apparatus is stopped, or only time when the air-conditioning apparatus is in a normal state A described later.

In Step S1 of FIG. 5, the controller 30 acquires information on the refrigerant concentration around the refrigerant detection unit 99 on the basis of the detection signal received from the refrigerant detection unit 99.

Next, in Step S2, the controller 30 determines whether or not the refrigerant concentration around the refrigerant detection unit 99 is equal to or larger than a threshold value set in advance. When the controller 30 determines that the refrigerant concentration is equal to or larger than the threshold value, the procedure advances to Step S3, and when the refrigerant concentration is smaller than the threshold value, the processing is brought to an end.

In Step S3, the controller 30 starts the operation of the indoor air-sending fan 7f. When the indoor air-sending fan 7f is already operating, the operation is continued as it is. Further, in Step S3, the rotation speed of the indoor air-sending fan 7f may be set to a rotation speed at which the refrigerant can be sufficiently diffused even when the refrigerant leakage amount is maximum (for example, rotation speed that is equal to or larger than a threshold value R1 described later). The rotation speed is not limited to the rotation speed used during a normal operation. In Step S3, the notifier (for example, display unit or audio output unit) provided in the operation unit 26 may be used to output the notification that the leakage of the refrigerant has occurred. Further, the indoor air-sending fan 7f that has started to operate in Step S3 may be stopped after a predetermined time set in advance has elapsed.

As described above, in the refrigerant leakage detection processing, when the leakage of the refrigerant is detected (that is, when the refrigerant concentration detected by the refrigerant detection unit 99 is equal to or larger than the threshold value), the indoor air-sending fan 7f starts being operated. With this operation, it is possible to diffuse the leaked refrigerant. Hence, it is possible to inhibit the refrigerant concentration from increasing locally indoors.

As described above, in the first embodiment, examples of the refrigerant to be circulated by the refrigerant circuit 40 include flammable refrigerants such as HFO-1234yf, HFO-1234ze, R290, and R1270. Consequently, if leakage of refrigerant occurs in the indoor unit 1, there is a fear that the indoor refrigerant concentration is increased to form a flammable concentration region (for example, region in which the refrigerant concentration is equal to or larger than the lower flammable limit (LFL)).

These flammable refrigerants have a density larger than that of air under the atmospheric pressure. Consequently, when the leakage of the refrigerant occurs at a position at which the height from the floor surface of the indoor space is relatively large, the leaked refrigerant is diffused while descending. Thus, the refrigerant concentration becomes uniform in the indoor space, and hence the refrigerant concentration is less liable to be increased. In contrast, when the leakage of the refrigerant occurs at a position at which the height from the floor surface of the indoor space is small, the leaked refrigerant remains at a low position close to the floor surface, and hence the refrigerant concentration tends to be locally increased. As a result, the risk of the formation of the flammable concentration region is relatively increased.

While the air-conditioning apparatus is operated, air is blown off to the indoor space due to the operation of the indoor air-sending fan 7f of the indoor unit 1. Consequently, even if the flammable refrigerant leaks to the indoor space, the leaked flammable refrigerant is diffused in the indoor space by the air being blown off. In this manner, the flammable concentration region can be inhibited from being formed in the indoor space. However, while the air-conditioning apparatus is stopped, the indoor air-sending fan 7f of the indoor unit 1 is also stopped, and hence the leaked refrigerant cannot be diffused by the air being blown off. Consequently, detection of the leaked refrigerant is more required while the air-conditioning apparatus is stopped. In the first embodiment, the operation of the indoor air-sending fan 7f is started when the leakage of the refrigerant is detected, and hence the flammable concentration region can be inhibited from being formed in the indoor space even when the flammable refrigerant leaks to the indoor space while the air-conditioning apparatus is stopped.

Figure 6:
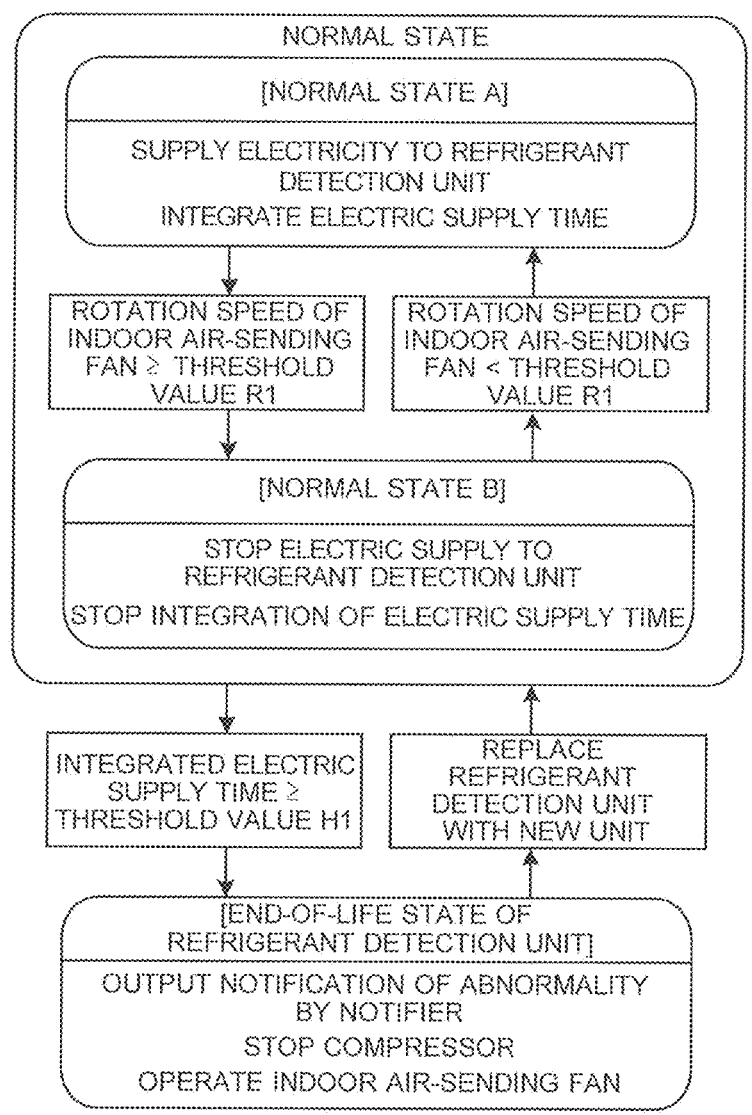
FIG. 6 is a state transition diagram for illustrating an example of a state transition of the air-conditioning apparatus according to the first embodiment of the present invention.

FIG. 6 is a state transition diagram for illustrating an example of a state transition of the air-conditioning apparatus according to the first embodiment. As illustrated in FIG. 6, states of the air-conditioning apparatus include at least the normal state A, a normal state B, and an end-of-life state of the refrigerant detection unit 99. Among these states, the normal state A and the normal state B are both normal states in which the leakage of the refrigerant has not occurred. The air-conditioning apparatus in the normal state A or the normal state B conducts and stops the operation in the normal state in accordance with the user's operation through the operation unit 26 or other operations. The state of the air-conditioning apparatus in the normal state is controlled by the controller 30 on the basis of the rotation speed of the indoor air-sending fan 7f to mutually transition between the normal state A and the normal state B. The threshold value R1 of the rotation speed used for the determination of the state transition between the normal state A and the normal state B is stored in advance in the ROM of the controller 30.

The end-of-life state of the refrigerant detection unit 99 among the above-mentioned states is a state in which it is determined that the refrigerant detection unit 99 has come to its end of life on the basis of the time of electric supply to the refrigerant detection unit 99. The end-of-life state of the refrigerant detection unit 99 is a state in which there is a risk of delay in detection of leakage of refrigerant when the leakage occurs. Hence, in the first embodiment, the end-of-life state of the refrigerant detection unit 99 is treated not as the normal state but as one type of abnormal state. A threshold value H1 of the time of electric supply, which is used for determination of a state transition from the normal state to the end-of-life state of the refrigerant detection unit 99, is stored in advance in the ROM of the controller 30.

The stopped air-conditioning apparatus in which the indoor air-sending fan 7f is stopped is in the normal state A. In the normal state A, the refrigerant detection unit 99 is supplied with electricity through control of the controller 30. With this operation, the refrigerant detection unit 99 enters an operation state in which the refrigerant detection unit 99 can detect the refrigerant. That is, the normal state A refers to a state in which the leakage of the refrigerant can be detected by the refrigerant detection unit 99. Further, in the normal state A, the timer included in the microcomputer of the controller 30 is used to integrate the time of electric supply to the refrigerant detection unit 99 as an integrated time of electric supply. The initial value of the integrated time of electric supply is 0. The value of the integrated time of electric supply is held even when power supply to the air-conditioning apparatus is interrupted. The integrated time of electric supply is prevented from being reset unless the refrigerant detection unit 99 is replaced with a new unit.

When the operation of the air-conditioning apparatus is started in accordance with the user's operation or other operations, the indoor air-sending fan 7f is controlled by the controller 30 to rotate at a predetermined rotation speed. On condition that the rotation speed of the indoor air-sending fan 7f becomes equal to or larger than the threshold value R1 set in advance in the normal state A, the controller 30 causes the state of the air-conditioning apparatus to transition from the normal state A to the normal state B. In the normal state B, the electric supply to the refrigerant detection unit 99 is stopped through the control of the controller 30. With this operation, the refrigerant detection unit 99 enters a stopped state in which the refrigerant detection unit 99 cannot detect the refrigerant. That is, the normal state B refers to a state in which the leakage of the refrigerant cannot be detected by the refrigerant detection unit 99. Further, in the normal state B, the integration of the time of electric supply to the refrigerant detection unit 99 is stopped.

On condition that the rotation speed of the indoor air-sending fan 7f becomes smaller than the threshold value R1 in the normal state B, the controller 30 causes the state of the air-conditioning apparatus to transition from the normal state B to the normal state A again. In the normal state A, the electric supply to the refrigerant detection unit 99 and the integration of the time of electric supply are restarted.

When the maximum rotation speed and the minimum rotation speed of the indoor air-sending fan 7f are represented by Rmax and Rmin, respectively, the threshold value R1 is set, for example, within a rotation speed range of 0 or more and Rmax or less ($0 \leq R1 \leq Rmax$), preferably within a rotation speed range of more than 0 and Rmax or less ($0 < R1 \leq Rmax$), more preferably within a rotation speed range of more than Rmin and Rmax or less ($Rmin < R1 \leq Rmax$). In this case, the maximum rotation speed Rmax is a maximum rotation speed as that of the indoor air-sending fan 7f or a motor of the indoor air-sending fan 7f. The rotation speed of the indoor air-sending fan 7f during the normal operation is set to be equal to or smaller than the maximum rotation speed Rmax. That is, the maximum rotation speed of the indoor air-sending fan 7f during the normal operation is equal to or smaller than the maximum rotation speed Rmax. When a flammable refrigerant is used, the threshold value R1 is desired to be set to be equal to or larger than a rotation speed that inhibits the flammable concentration region from being formed in the indoor space even when the maximum amount of refrigerant leaks to the indoor space. The threshold value R1 is set such that the control tolerance is taken into consideration. Further, when the rotation speed of the indoor air-sending fan 7f varies due to the load of the motor, the threshold value R1 is set such that the maximum load is taken into consideration.

In the normal states (for example, normal state A) described above, when the integrated time of electric supply to the refrigerant detection unit 99 becomes equal to or larger than the threshold value H1, for example, the controller 30 determines that the refrigerant detection unit 99 has come to its end of life, and causes the state of the air-conditioning apparatus to transition to the end-of-life state of the refrigerant detection unit 99.

When the refrigerant detection unit 99 comes to its end of life, there is a risk of delay in detection of leakage of refrigerant when the leakage occurs due to the secular change in detection characteristics. Hence, after the transition to the end-of-life state of the refrigerant detection unit 99, the controller 30 conducts the following control. That is, the controller 30 conducts control for outputting the notification of an abnormality by a notifier (for example, display unit or audio output unit) provided in the operation unit 26. With this control, for example, the display unit displays textual information indicating that the refrigerant detection unit 99 has come to its end of life or that the refrigerant detection unit 99 is in an abnormal state. The display unit may display textual information for prompting the user to ask an expert service person for a repair (for example, replacement of the refrigerant detection unit 99).

Further, the controller 30 may conduct control for operating the indoor air-sending fan 7f. With this control, when the indoor air-sending fan 7f is stopped, the operation of the indoor air-sending fan 7f is started. When the indoor air-sending fan 7f is already operating, the operation is continued as it is.

Further, the controller 30 may conduct control for stopping the compressor 3. With this control, when the compressor 3 is operating, the compressor 3 is stopped, and when the compressor 3 is stopped, the stopped state of the compressor 3 is maintained. Further, the controller 30 may conduct control for inhibiting restart of the operation of the compressor 3.

In the end-of-life state of the refrigerant detection unit 99, when the refrigerant detection unit 99 is replaced with a new unit, the controller 30 causes the state of the air-conditioning apparatus to transition to the normal state (for example, normal state A). For example, the end-of-life state of the refrigerant detection unit 99 transitions to the normal state only when the refrigerant detection unit 99 is replaced with a new unit. That is, once the state of the air-conditioning apparatus transitions to the end-of-life state of the refrigerant detection unit 99, the state does not return to the normal state unless the service person replaces the refrigerant detection unit 99 with a new unit to remove the abnormality.

Further, in the first embodiment, methods of removing the abnormality are limited to methods that can be conducted only by an expert service person. This limitation can prevent the user from removing the abnormality irrespective of an unfinished replacement of the refrigerant detection unit 99 with a new unit. Hence, the refrigerant detection unit 99 whose detection characteristics have been changed can be prevented from being kept in continuous use, and the safety of the air-conditioning apparatus can be guaranteed. The methods of removing the abnormality are limited to, for example, the following methods (1) to (4).
(1) Replacement of, for example, a control board of the controller 30
(2) Use of a dedicated checker device
(3) A special operation of the operation unit 26 (including a remote controller)
(4) An operation of the switch mounted on the control board of the controller 30

To prevent the user from removing the abnormality, it is desired that the abnormality can be removed only by the methods (1) and (2), and it is further desired that the abnormality can be removed only by the method (1).

Figure 7:
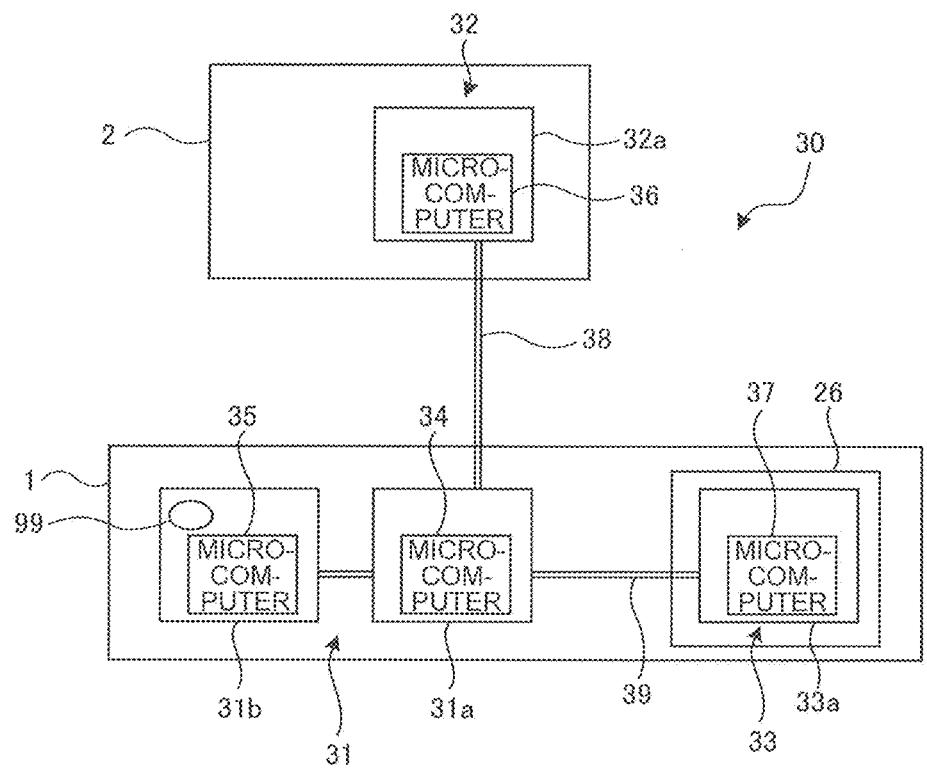
FIG. 7 is a block diagram for illustrating an example of a configuration of the controller 30 of the air-conditioning apparatus according to the first embodiment of the present invention.

The example of the configuration of the controller 30 that allows removal of the abnormality only by the above-mentioned method (1) is described below. FIG. 7 is a block diagram for illustrating the example of the configuration of the controller 30. As illustrated in FIG. 7, the controller 30 includes, for example, an indoor unit controller 31 mounted to the indoor unit 1 and configured to control the indoor unit 1, an outdoor unit controller 32 mounted to the outdoor unit 2 and configured to control the outdoor unit 2, and an operation unit controller 33 mounted to the operation unit 26 and configured to control the operation unit 26. The operation unit 26 of the first embodiment is fixedly provided to the indoor unit 1, but the operation unit 26 may be a remote controller provided separately from the indoor unit 1 and capable of remotely operating the air-conditioning apparatus.

The indoor unit controller 31 includes a control board 31a and a control board 31b capable of communicating with the control board 31a through a control line. The indoor unit controller 31 is configured to communicate with the outdoor unit controller 32 and the operation unit controller 33. A microcomputer 34 is mounted on the control board 31a. A microcomputer 35 and the electric supply-type refrigerant detection unit 99 are unremovably mounted on the control board 31b. The electric supply and the non-electric supply to the refrigerant detection unit 99 are switched by the control conducted by the microcomputer 35. The time of electric supply to the refrigerant detection unit 99 is integrated by the microcomputer 35. The refrigerant detection unit 99 according to the first embodiment is directly mounted on the control board 31b, but it suffices that the refrigerant detection unit 99 is unremovably connected to the control board 31b. For example, the refrigerant detection unit 99 may be provided in a position distant from the control board 31b, and a wiring extending from the refrigerant detection unit 99 may be connected to the control board 31b by soldering or other ways. Further, in the first embodiment, the control board 31b is provided separately from the control board 31a, but the control board 31b may be omitted, and the refrigerant detection unit 99 may be unremovably connected to the control board 31a.

The outdoor unit controller 32 includes a control board 32a. A microcomputer 36 is mounted on the control board 32a.

The operation unit controller 33 includes a control board 33a. A microcomputer 37 is mounted on the control board 33a.

The indoor unit controller 31 and the outdoor unit controller 32 are communicably connected to each other through a control line 38. The indoor unit controller 31 and the operation unit controller 33 are communicably connected to each other through a control line 39.

The microcomputer 35 mounted on the control board 31b includes a rewritable nonvolatile memory (for example, flash memory). The nonvolatile memory is provided with an abnormality history bit (example of an abnormality history storage area) for storing a history of the abnormality of the refrigerant detection unit 99. The abnormality history bit of the microcomputer 35 can be set to "0" or "1". The abnormality history bit has an initial value of "0". That is, in a case of the microcomputer 35 in brand-new conditions or the microcomputer 35 having no abnormality history, the abnormality history bit is set to "0". The abnormality history bit of the microcomputer 35 is rewritten from "0" to "1" when, for example, the integrated time of electric supply to the refrigerant detection unit 99 becomes equal to or larger than the threshold value H1. In other words, the abnormality history bit of the microcomputer 35 is set to "0" when the state of the air-conditioning apparatus is the normal state A or the normal state B, and the abnormality history bit of the microcomputer 35 is set to "1" when the state of the air-conditioning apparatus is the end-of-life state of the refrigerant detection unit 99. The abnormality history bit of the microcomputer 35 can be rewritten from "0" to "1" irreversibly only in one way. Further, the abnormality history bit of the microcomputer 35 is maintained irrespective of whether or not electric power is supplied to the microcomputer 35. The abnormality history bit may be used only for storing whether or not the refrigerant detection unit 99 has come to its end of life. In this case, the abnormality history bit can be referred to as end-of-life bit, and the abnormality history storage area can be referred to as end-of-life storage area.

Further, memories (nonvolatile memories or volatile memories) of the microcomputers 34, 36, and 37 are each provided with the abnormality history bit corresponding to the abnormality history bit of the microcomputer 35. The abnormality history bits of the microcomputers 34, 36, and 37 can be set to "0" or "1", The abnormality history bits of the microcomputers 34, 36, and 37 can be rewritten in both ways between "0" and "1". The abnormality history bits of the microcomputers 34, 36, and 37 have values set to the same value as that of the abnormality history bit of the microcomputer 35 acquired through communications. Even when returning to the initial value (for example, "0") due to an interruption of the electric power supply, the abnormality history bits of the microcomputers 34, 36, and 37 are set to the same value as that of the abnormality history bit of the microcomputer 35 again when the electric power supply is restarted.

When the abnormality history bit of the microcomputer 34 is set to "0", the indoor unit controller 31 normally controls the indoor unit 1. The indoor unit 1 in this state conducts and stops the operation in a normal state in accordance with the operation through the operation unit 26. Meanwhile, when the abnormality history bit of the microcomputer 34 is set to "1", the indoor unit controller 31 conducts control for causing the notifier provided in the operation unit 26 to output the notification of the abnormality. With this control, the display unit of the operation unit 26 displays, for example, textual information indicating that the refrigerant detection unit 99 has come to its end of life or that the refrigerant detection unit 99 is in an abnormal state, or textual information indicating measures to be taken by the user (for example, contact to the service person). This display is maintained as long as the abnormality history bit of the microcomputer 34 is set to "1". Further, the indoor unit controller 31 conducts, for example, control for forcedly operating the indoor air-sending fan 7f.

When the abnormality history bit of the microcomputer 36 is set to "0", the outdoor unit controller 32 normally controls the outdoor unit 2. Meanwhile, when the abnormality history bit of the microcomputer 36 is set to "1", the outdoor unit controller 32 conducts, for example, control for stopping the compressor 3. The stoppage of the compressor 3 is continued as long as the abnormality history bit of the microcomputer 36 is set to "1".

When the abnormality history bit of the microcomputer 37 is set to "0", the operation unit controller 33 normally controls the operation unit 26. Meanwhile, when the abnormality history bit of the microcomputer 37 is set to "1", the operation unit controller 33 conducts control for causing the display unit provided in the operation unit 26 to output the notification of the abnormality. With this control, the display unit of the operation unit 26 displays, for example, textual information indicating that the refrigerant detection unit 99 has come to its end of life or that the refrigerant detection unit 99 is in an abnormal state, or textual information indicating measures to be taken by the user (for example, contact to the service person). This display is maintained as long as the abnormality history bit of the microcomputer 37 is set to "1".

In such a configuration, when the integrated time of electric supply to the refrigerant detection unit 99 becomes equal to or larger than the threshold value H1, the microcomputer 35 rewrites the abnormality history bit from the initial value "0" to "1" irreversibly. When the abnormality history bit of the microcomputer 35 is set to "1", the abnormality history bits of the microcomputers 34, 36, and 37 are also rewritten from "0" to "1". With this control, the state of the air-conditioning apparatus transitions to the end-of-life state of the refrigerant detection unit 99, and the forced operation of the indoor air-sending fan 7f, the stoppage of the compressor 3, the displaying of the information on the display unit of the operation unit 26, and other operations are conducted.

The service person contacted by the user replaces the refrigerant detection unit 99 with a new unit. The refrigerant detection unit 99 is unremovably connected to the control board 31b, and hence when the refrigerant detection unit 99 is replaced with a new unit, the control board 31b is also replaced with a new board.

The abnormality history bit of the microcomputer 35 mounted on the replaced control board 31b is set to "0" that is the initial value. Hence, the abnormality history bits of the microcomputers 34, 36, and 37 are also rewritten from "1" to "0". Further, when the control board 31b is replaced, the integrated time of electric supply is set to 0 that is the initial value. This control allows the state of the air-conditioning apparatus to transition to the normal state to enable normal operation of the air-conditioning apparatus.

When the electric supply-type refrigerant detection unit 99 in the electricity supplied state is exposed to a gas to be detected or miscellaneous gases other than the gas to be detected for a long period of time, the detection characteristics may be changed. In particular, when the refrigerant detection unit 99 is arranged in a high-temperature environment, a high-humidity environment, or other environments, the detection characteristics may be changed at increased speed. In view of this problem, in the first embodiment, the user is informed of the abnormality when the integrated time of electric supply to the refrigerant detection unit 99 becomes equal to or larger than the threshold value H1. In this manner, the user can be prompted about replacement of the refrigerant detection unit 99, and hence the refrigerant detection unit 99 whose detection characteristics have been changed can be prevented from being kept in continuous use.

Further, in the first embodiment, the electric supply to the refrigerant detection unit 99 is stopped in the normal state B in which the rotation speed of the indoor air-sending fan 7f is equal to or larger than the threshold value R1. As a result, the time of electric supply of the refrigerant detection unit 99 can be reduced, and hence the change in detection characteristics of the refrigerant detection unit 99 can be reduced. If the leakage of the refrigerant occurs in the normal state B, the leakage cannot be detected by the refrigerant detection unit 99. However, the indoor air-sending fan 7f is rotated at a rotation speed that is equal to or larger than the threshold value R1 in the normal state B, and hence the leaked refrigerant can be diffused to the indoor space.

Further, according to the first embodiment, the secular change of the refrigerant detection unit 99 can be reduced, and hence the detection characteristics of the refrigerant detection unit 99 can be maintained for a long period of time. As a result, when the refrigerant leaks in the normal state A, the leakage of the refrigerant can be detected more reliably, and hence the indoor air-sending fan 7f can be operated more reliably. Further, the detection characteristics of the refrigerant detection unit 99 can be maintained for a long period of time, and hence the replacement frequency of the refrigerant detection unit 99 can be decreased.

As described above, in the first embodiment, the indoor air-sending fan 7f can be reliably operated irrespective of whether the refrigerant leaks in the normal state A or the normal state B. Consequently, according to the first embodiment, even if the refrigerant leaks, the refrigerant concentration can be inhibited from being locally increased. As a result, even when, for example, a flammable refrigerant is used, it is possible to inhibit the flammable concentration region from being formed in the indoor space.

In the first embodiment, the abnormality history bit that stores the presence or absence of the abnormality history (for example, whether or not the refrigerant detection unit 99 has come to its end of life) with one bit is exemplified as the abnormality history storage area provided to the nonvolatile memory, but the present invention is not limited to this configuration. The nonvolatile memory may be provided with, for example, the abnormality history storage area having two bits or more. The abnormality history storage area selectively stores any one of first information indicating the state in which the refrigerant detection unit 99 has not come to its end of life and second information indicating the state in which the refrigerant detection unit 99 has come to its end of life. Further, the information stored in the abnormality history storage area can be changed from the first information to the second information only in one way. The indoor unit controller 31 is configured to change the information stored in the abnormality history storage area from the first information to the second information when the integrated time of electric supply to the refrigerant detection unit 99 becomes equal to or larger than the threshold value H1.

Second Embodiment

Figure 8:
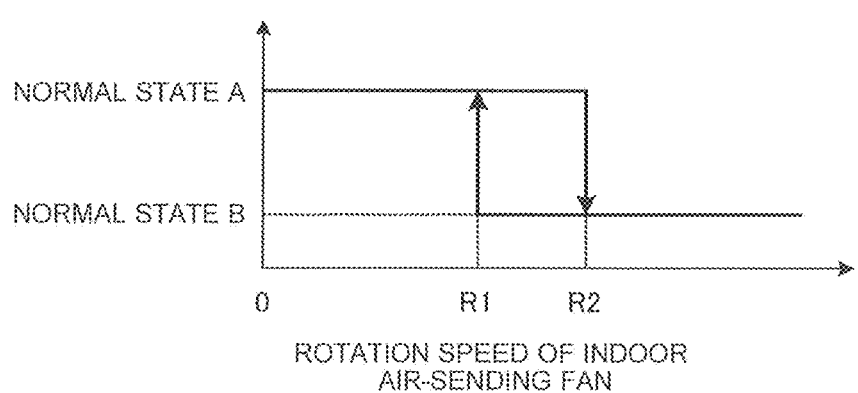
FIG. 8 is a graph for showing a relationship between a rotation speed of an indoor air-sending fan 7$f$ and an air-conditioning apparatus state in an air-conditioning apparatus according to a second embodiment of the present invention.

A refrigeration cycle apparatus according to a second embodiment of the present invention is described. In the second embodiment, an air-conditioning apparatus is exemplified as an example of the refrigeration cycle apparatus. The basic configuration of the air-conditioning apparatus according to the second embodiment is similar to that of the above-mentioned first embodiment, and hence a description of the configuration is omitted. FIG. 8 is a graph for showing a relationship between the rotation speed of the indoor air-sending fan 7f and the air-conditioning apparatus state in the air-conditioning apparatus according to the second embodiment. In FIG. 8, the horizontal axis represents the rotation speed of the indoor air-sending fan 7f, and the vertical axis represents the state of the air-conditioning apparatus. As shown in FIG. 8, in the second embodiment, a differential serving as a dead zone for control is set between the threshold value R1 used for transition from the normal state B to the normal state A and a threshold value R2 used for transition from the normal state A to the normal state B. In this case, the threshold value R2 is a value larger than the threshold value R1 (R2>R1). The threshold value R1 and the threshold value R2 are set, for example, within a rotation speed range of 0 or more and Rmax or less (0<R1<R2≤Rmax), preferably within a rotation speed range of more than 0 and Rmax or less ((0<R1<R2≤Rmax), more preferably within a rotation speed range of more than Rmin and Rmax or less (Rmin<R1<R2≤Rmax).

When the air-conditioning apparatus is in the normal state A, and the rotation speed of the indoor air-sending fan 7f becomes equal to or larger than the threshold value R2, the air-conditioning apparatus transitions from the normal state A to the normal state B. Meanwhile, when the air-conditioning apparatus is in the normal state B, and the rotation speed of the indoor air-sending fan 7f becomes smaller than the threshold value R1, the air-conditioning apparatus transitions from the normal state B to the normal state A. The point that the refrigerant detection unit 99 is supplied with electricity in the normal state A and the electric supply to the refrigerant detection unit 99 is stopped in the normal state B is similar to that in the above-mentioned first embodiment.

In the above-mentioned first embodiment, when the indoor air-sending fan 7f is operated at a rotation speed close to the threshold value R1, the electric supply and the non-electric supply to the refrigerant detection unit 99 may be frequently switched. In contrast, in the second embodiment, a differential is set between the threshold value R2 used for transition from the normal state A to the normal state B and the threshold value R1 used for transition from the normal state B to the normal state A. Consequently, according to the second embodiment, the electric supply and the non-electric supply to the refrigerant detection unit 99 can be prevented from being frequently switched.

As described above, the refrigeration cycle apparatus according to the above-mentioned first and second embodiments includes the refrigerant circuit 40 configured to circulate refrigerant, the indoor unit 1 installed indoors and accommodating the load-side heat exchanger 7 of the refrigerant circuit 40, and the controller 30 configured to control the indoor unit 1. The indoor unit 1 includes the indoor air-sending fan 7f, the electric supply-type refrigerant detection unit 99, and the notifier (for example, display unit or audio output unit provided in the operation unit 26) configured to output the notification of the abnormality. The controller 30 is configured to stop electric supply to the refrigerant detection unit 99 when an electric supply stop condition (for example, a condition in which the rotation speed of the indoor air-sending fan 7f becomes equal to or larger than the threshold value R1 or equal to or larger than the threshold value R2) is satisfied under a state in which the refrigerant detection unit 99 is supplied with electricity, supply electricity to the refrigerant detection unit 99 when an electric supply condition (for example, a condition in which the rotation speed of the indoor air-sending fan 7f becomes smaller than the threshold value R1) is satisfied under a state in which the electric supply to the refrigerant detection unit 99 is stopped, and cause the notifier to output the notification of the abnormality when the integrated time of electric supply to the refrigerant detection unit 99 becomes equal to or larger than a threshold time (for example, threshold value H1).

According to this configuration, the user or others can be prompted about replacement of the refrigerant detection unit 99 when the integrated time of electric supply to the refrigerant detection unit 99 becomes equal to or larger than the threshold value H1, and hence the refrigerant detection unit 99 whose detection characteristics have been changed can be prevented from being kept in continuous use.

Further, in the refrigeration cycle apparatus according to the above-mentioned embodiments, the controller 30 may be configured to stop the compressor 3 of the refrigerant circuit 40 when the integrated time of electric supply becomes equal to or larger than the threshold value H1.

When the integrated time of electric supply to the refrigerant detection unit 99 becomes equal to or larger than the threshold value H1, there is a risk of delay in detection of leakage of refrigerant when the leakage occurs due to the secular change of the detection characteristics of the refrigerant detection unit 99. According to the above-mentioned configuration, the compressor 3 of the refrigerant circuit 40 is stopped when the integrated time of electric supply becomes equal to or larger than the threshold value H1. Thus, the progress of the leakage can be reduced even when the leakage of the refrigerant occurs.

Further, in the refrigeration cycle apparatus according to the above-mentioned embodiments, the controller 30 may be configured to operate the indoor air-sending fan 7f when the integrated time of electric supply becomes equal to or larger than the threshold value H1.

When the integrated time of electric supply to the refrigerant detection unit 99 becomes equal to or larger than the threshold value H1, there is a risk of delay in detection of leakage of refrigerant when the leakage occurs due to the secular change of the detection characteristics of the refrigerant detection unit 99. According to the above-mentioned configuration, the indoor air-sending fan 7f is operated when the integrated time of electric supply becomes equal to or larger than the threshold value H1. Thus, the leaked refrigerant can be diffused even when the leakage of the refrigerant occurs.

Further, in the refrigeration cycle apparatus according to the above-mentioned embodiments, the electric supply stop condition may be a condition in which the rotation speed of the indoor air-sending fan 7f becomes equal to or larger than a first threshold rotation speed (for example, threshold value R1 of the first embodiment or threshold value R2 of the second embodiment), and the electric supply condition may be a condition in which the rotation speed of the indoor air-sending fan becomes smaller than a second threshold rotation speed (for example, threshold value R1 of the first and second embodiments). The second threshold rotation speed may be equal to or smaller than the first threshold rotation speed.

According to this configuration, the time of electric supply of the refrigerant detection unit 99 can be reduced, and hence the secular change in detection characteristics of the refrigerant detection unit 99 can be reduced. Further, when the electric supply to the refrigerant detection unit 99 is stopped, the indoor air-sending fan 7f is rotated at the first threshold rotation speed or more. Thus, even when the refrigerant leaks while the electric supply to the refrigerant detection unit 99 is stopped, the leaked refrigerant can be diffused.

Further, in the refrigeration cycle apparatus according to the above-mentioned embodiments, the controller 30 may include the control board 31b to which the refrigerant detection unit 99 is unremovably connected, and the nonvolatile memory (for example, nonvolatile memory included in the microcomputer 35) provided on the control board 31b. The nonvolatile memory may be provided with an abnormality history bit that can be set to "0" that is the initial value or "1", and the abnormality history bit can be rewritten from "0" to "1" only in one way. The controller 30 may be configured to rewrite the abnormality history bit from "0" to "1" when the integrated time of electric supply becomes equal to or larger than the threshold value H1.

According to this configuration, an abnormality history is written to the nonvolatile memory of the control board 31b irreversibly when the integrated time of electric supply to the refrigerant detection unit 99 becomes equal to or larger than the threshold value H1. To reset the abnormality history, the control board 31b is required to be replaced with another control board 31b having no abnormality history. When the control board 31b is replaced, the refrigerant detection unit 99 unremovably connected to the control board 31b is also replaced. Hence, the refrigerant detection unit 99 whose detection characteristics have been changed can be prevented from being kept in continuous use.

Further, in the refrigeration cycle apparatus according to the above-mentioned embodiments, the controller 30 may be configured to operate the indoor air-sending fan 7f when the controller 30 detects leakage of the refrigerant on the basis of the detection signal from the refrigerant detection unit 99.

According to this configuration, the leaked refrigerant can be diffused even when the refrigerant leaks.

Third Embodiment

A refrigeration cycle apparatus according to a third embodiment of the present invention is described. In the third embodiment, an air-conditioning apparatus is exemplified as the refrigeration cycle apparatus. In the third embodiment, the integrated time of electric supply has, in addition to the threshold value H1 (example of the first threshold time), a threshold value H2 (example of a second threshold time) that is smaller than the threshold value H1 (H1>H2). The threshold values H1 and H2 are stored in advance in the ROM of the controller 30.

In the normal state (for example, normal state A or normal state B), when the integrated time of electric supply to the refrigerant detection unit 99 is smaller than the threshold value H1 but becomes equal to or larger than the threshold value H2, the controller 30 determines that the refrigerant detection unit 99 has come close to its end of life. That is, when the integrated time of electric supply to the refrigerant detection unit 99 becomes equal to or larger than the threshold value H2, the controller 30 causes the notifier provided in the operation unit 26 to output the notification of information indicating that the refrigerant detection unit 99 has come close to its end of life or information for prompting the user to replace the refrigerant detection unit 99 as an advance notice of the abnormality. In this manner, the user can be prompted about replacement of the refrigerant detection unit 99 before the refrigerant detection unit 99 comes to its end of life. For example, the threshold value H2 is set to a time of about 80% of the threshold value H1. In this case, a time of about 20% of the threshold value H1 is ensured from the notification of the advance notice of the end of life to the actual end of life of the refrigerant detection unit 99. Hence, the user can have time for calling the service person for replacement with a new unit before the refrigerant detection unit 99 comes to its end of life.

The controller 30 is configured to select whether or not to cause the notifier to output the notification of the advance notice of the abnormality as described above in accordance with the operation of the operation unit. For example, the controller 30 selects whether or not to cause the notifier to output the notification of the advance notice of the end of life on the basis of the setting operation with a DIP switch provided on the control board of the indoor unit controller or on the setting operation with the operation unit 26. The setting operation with the DIP switch or the setting operation with the operation unit 26 is performed by, for example, the installation contractor or the service provider of the air-conditioning apparatus.

For example, a user having a periodic maintenance contract with the maintenance provider (installing service provider) of the air-conditioning apparatus does not need to contact the maintenance provider for himself or herself to request replacement of the refrigerant detection unit 99. This is because, when the periodic maintenance contract is concluded, the maintenance provider can conduct actions of the replacement of the refrigerant detection unit 99 before the refrigerant detection unit 99 comes to its end of life on the basis of a customer inspection record (for example, operation history, failure history, and repair history from installation to present). That is, such an air-conditioning apparatus is not necessarily required to output the notification of the advance notice of the end of life of the refrigerant detection unit 99. When the user is informed of information that the user does not need to know through display (for example, characters or blinking light) or sound, the information may be an eyesore or an earsore for the user, and the user may feel discomfort. In the third embodiment, whether or not to cause the notifier to output the notification of the advance notice of the end of life can be set, and hence the advance notice of the end of life by the notifier can be prevented from being an eyesore or an earsore for the user. Thus, the user can be prevented from feeling unnecessary discomfort.

Fourth Embodiment

Figure 9:
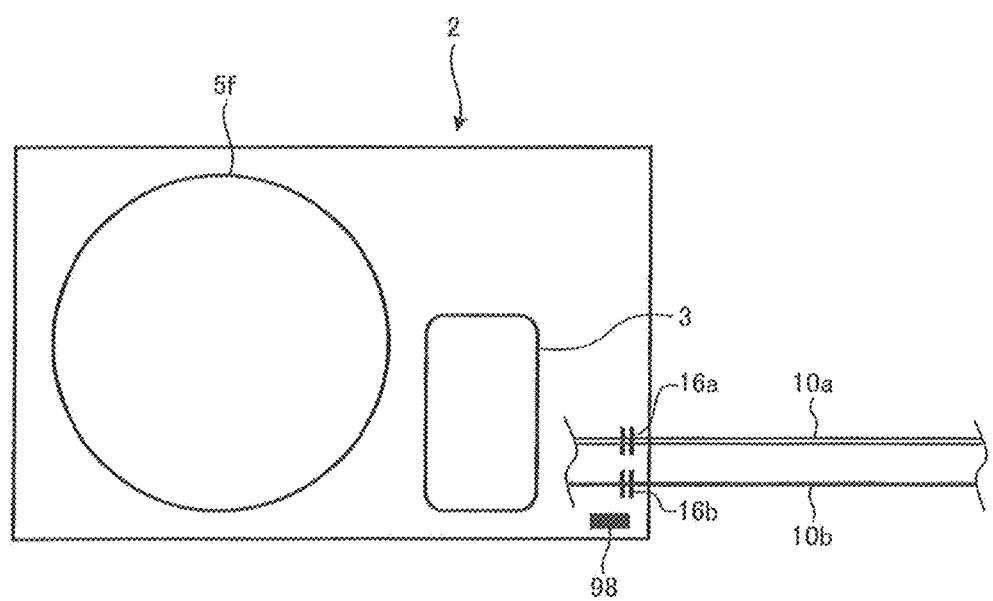
FIG. 9 is a diagram for schematically illustrating a configuration of an outdoor unit 2 of an air-conditioning apparatus according to a fourth embodiment of the present invention.

A refrigeration cycle apparatus according to a fourth embodiment of the present invention is described. In the fourth embodiment, an air-conditioning apparatus is exemplified as the refrigeration cycle apparatus. FIG. 9 is a diagram for schematically illustrating a configuration of the outdoor unit 2 of an air-conditioning apparatus according to the fourth embodiment. As already described above, the outdoor unit 2 accommodates, for example, the compressor 3, the refrigerant flow switching device 4, the heat source-side heat exchanger 5, the pressure reducing device 6, and the outdoor air-sending fan 5f. Of these, the compressor 3 and the outdoor air-sending fan 5f are illustrated in FIG. 9. The rotation speed of the outdoor air-sending fan 5f is controlled by the controller 30 to be variably set at multiple stages (for example, two stages or more) or continuously. The extension pipes 10a and 10b are connected to the outdoor unit 2. The extension pipes 10a and 10b and the refrigerant pipes inside the outdoor unit 2 are connected to each other through joint portions 16a and 16b (for example, flare joints). The joint portions 16a and 16b are arranged inside the outdoor unit 2. The joint portions 16a and 16b may be arranged outside the outdoor unit 2.

The outdoor unit 2 (example of the heat exchanger unit) of the fourth embodiment includes a refrigerant detection unit 98. The refrigerant detection unit 98 is arranged, for example, inside the outdoor unit 2 and below the joint portions 16a and 16b. The refrigerant detection unit 98 may be arranged below a brazed portion of the heat source-side heat exchanger 5. As the refrigerant detection unit 98, an electric supply gas sensor, for example, a semiconductor gas sensor or a hot-wire type semiconductor gas sensor, is used. The refrigerant detection unit 98 is configured to detect the refrigerant concentration in, for example, the air around the refrigerant detection unit 98, and to output the detection signal to the controller 30. The controller 30 is configured to determine the presence or absence of the leakage of the refrigerant on the basis of the detection signal received from the refrigerant detection unit 98.

The refrigerant leakage detection processing of the fourth embodiment executed by the controller 30 is obtained by replacing the "refrigerant detection unit 99" and the "indoor air-sending fan 7f" of the refrigerant leakage detection processing of any one of the first and second embodiments described with reference to, for example, FIG. 5, FIG. 6, and FIG. 8, by the "refrigerant detection unit 98" and the "outdoor air-sending fan 5f", respectively. That is, in the refrigerant leakage detection processing of the fourth embodiment, when the leakage of the refrigerant is detected on the basis of the detection signal received from the refrigerant detection unit 98, an operation of the outdoor air-sending fan 5f is started. Consequently, the leaked refrigerant can be diffused to an installation space of the outdoor unit 2 (for example, outdoor space or machine room space). Hence, according to the fourth embodiment, even if the refrigerant leaks from the outdoor unit 2, it is possible to inhibit the refrigerant concentration in the installation space of the outdoor unit 2 from increasing locally.

Further, in the fourth embodiment, the electric supply to the refrigerant detection unit 98 is stopped in the normal state B in which the rotation speed of the outdoor air-sending fan 5f is equal to or larger than the threshold value R1. As a result, the time of electric supply of the refrigerant detection unit 98 can be reduced, and hence the change in detection characteristics of the refrigerant detection unit 98 can be reduced. If the leakage of the refrigerant occurs in the normal state B, the leakage cannot be detected by the refrigerant detection unit 98. However, the outdoor air-sending fan 5f is rotated at a rotation speed that is equal to or larger than the threshold value R1 in the normal state B, and hence the leaked refrigerant can be diffused to the installation space of the outdoor unit 2.

Further, in the fourth embodiment, when the integrated time of electric supply to the refrigerant detection unit 98 becomes equal to or larger than the threshold value H1, it is determined that the refrigerant detection unit 98 has come to its end of life, and the notifier outputs the notification of the abnormality. Hence, according to the fourth embodiment, the user or others can be prompted about replacement of the refrigerant detection unit 98, and hence the refrigerant detection unit 98 whose detection characteristics have been changed can be prevented from being kept in continuous use.

Fifth Embodiment

Figure 10:
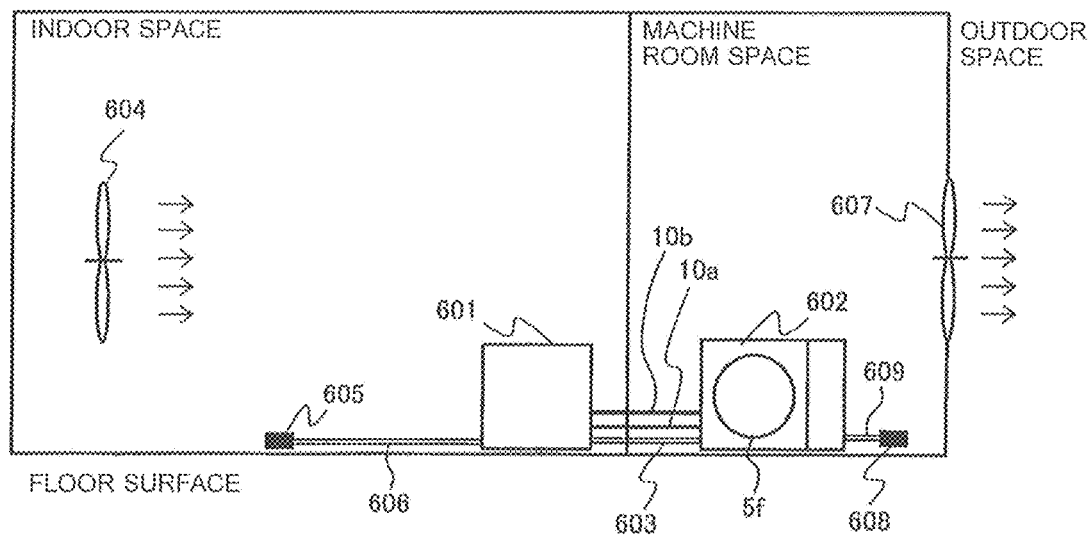
FIG. 10 is a diagram for schematically illustrating an overall configuration of a refrigeration cycle system according to a fifth embodiment of the present invention.

A refrigeration cycle system according to a fifth embodiment of the present invention is described. FIG. 10 is a diagram for schematically illustrating an overall configuration of the refrigeration cycle system according to the fifth embodiment. In the fifth embodiment, the refrigeration cycle apparatus included in the refrigeration cycle system is exemplified by a separate type showcase. As illustrated in FIG. 10, the showcase includes an indoor unit 601 (example of the load unit and example of the heat exchanger unit) installed in the indoor space, for example, inside a shop, and an outdoor unit 602 (example of the heat source unit and example of the heat exchanger unit) installed in, for example, the machine room space. The indoor unit 601 and the outdoor unit 602 are connected to each other through the extension pipes 10a and 10b. The indoor unit 601 of the fifth embodiment does not include an air-sending fan configured to stir the air in the installation space. The outdoor unit 602 includes the outdoor air-sending fan 5f.

Although not shown in FIG. 10, the controller 30 includes the indoor unit controller provided to the indoor unit 601 and the outdoor unit controller that is provided to the outdoor unit 602 and capable of conducting communications with the indoor unit controller. The indoor unit controller and the outdoor unit controller are connected to each other through a control line 603.

In the indoor space, an air-sending fan 604 configured to stir the air in the indoor space is provided separately from the showcase. The air-sending fan 604 is provided outside the casing of the indoor unit 601 of the showcase. The air-sending fan 604 can be operated, for example, independently of the showcase. The air-sending fan 604 is connected to the controller 30 (for example, indoor unit controller) through a control line (not shown). The rotation speed of the air-sending fan 604 is controlled by the controller 30 to be variably set at multiple stages (for example, two stages or more) or continuously. When the refrigerant leaks into the indoor space, the air-sending fan 604 is operated to stir the air in the indoor space together with leaked refrigerant. With this configuration, the leaked refrigerant is diffused to the indoor space, and hence it is possible to inhibit the refrigerant concentration from increasing locally in the indoor space. That is, the air-sending fan 604 acts as a leaked refrigerant dilution unit configured to dilute the refrigerant leaked into the indoor space.

Further, in the indoor space, a refrigerant detection unit 605 configured to detect the refrigerant is provided separately from the showcase. The refrigerant detection unit 605 is provided outside the casing of the indoor unit 601 of the showcase. The refrigerant has a density larger than that of air under the atmospheric pressure, and hence the refrigerant detection unit 605 is provided, for example, close to the floor surface in the indoor space. The refrigerant detection unit 605 is connected to the controller 30 (for example, indoor unit controller) through a communication line 606. As the refrigerant detection unit 605, an electric supply gas sensor, for example, a semiconductor gas sensor or a hot-wire type semiconductor gas sensor, is used. The refrigerant detection unit 605 is configured to detect the refrigerant concentration in the air around the refrigerant detection unit 605, and to output the detection signal to the controller 30. The controller 30 is configured to determine the presence or absence of the leakage of the refrigerant on the basis of the detection signal received from the refrigerant detection unit 605.

In the machine room space, an air-sending fan 607 for ventilation, which is configured to deliver the air in the machine room space to the outdoor space, is provided separately from the showcase. The air-sending fan 607 is provided outside the casing of the outdoor unit 602 of the showcase (for example, wall portion opposed to the outdoor space of the machine room space). The air-sending fan 607 can be operated, for example, independently of the showcase. The air-sending fan 607 is connected to the controller 30 (for example, outdoor unit controller) through a control line (not shown). The rotation speed of the air-sending fan 607 is controlled by the controller 30 to be variably set at multiple stages (for example, two stages or more) or continuously. When the refrigerant leaks into the machine room space, the air-sending fan 607 is operated to deliver the air in the machine room space to the outdoor space together with leaked refrigerant. With this configuration, the leaked refrigerant is delivered to the outdoor space, and hence it is possible to inhibit the refrigerant concentration from increasing locally in the machine room space. That is, the air-sending fan 607 acts as a leaked refrigerant dilution unit configured to dilute the refrigerant leaked into the machine room space.

Further, in the machine room space, a refrigerant detection unit 608 configured to detect the refrigerant is provided separately from the showcase. The refrigerant detection unit 608 is provided outside the casing of the outdoor unit 602 of the showcase. The refrigerant has a density larger than that of air under the atmospheric pressure, and hence the refrigerant detection unit 608 is provided, for example, close to the floor surface in the machine room space. The refrigerant detection unit 608 is connected to the controller 30 (for example, outdoor unit controller) through a communication line 609. As the refrigerant detection unit 608, an electric supply gas sensor, for example, a semiconductor gas sensor or a hot-wire type semiconductor gas sensor, is used. The refrigerant detection unit 608 is configured to detect the refrigerant concentration in the air around the refrigerant detection unit 608, and to output the detection signal to the controller 30. The controller 30 is configured to determine the presence or absence of the leakage of the refrigerant on the basis of the detection signal received from the refrigerant detection unit 608.

Figure 11:
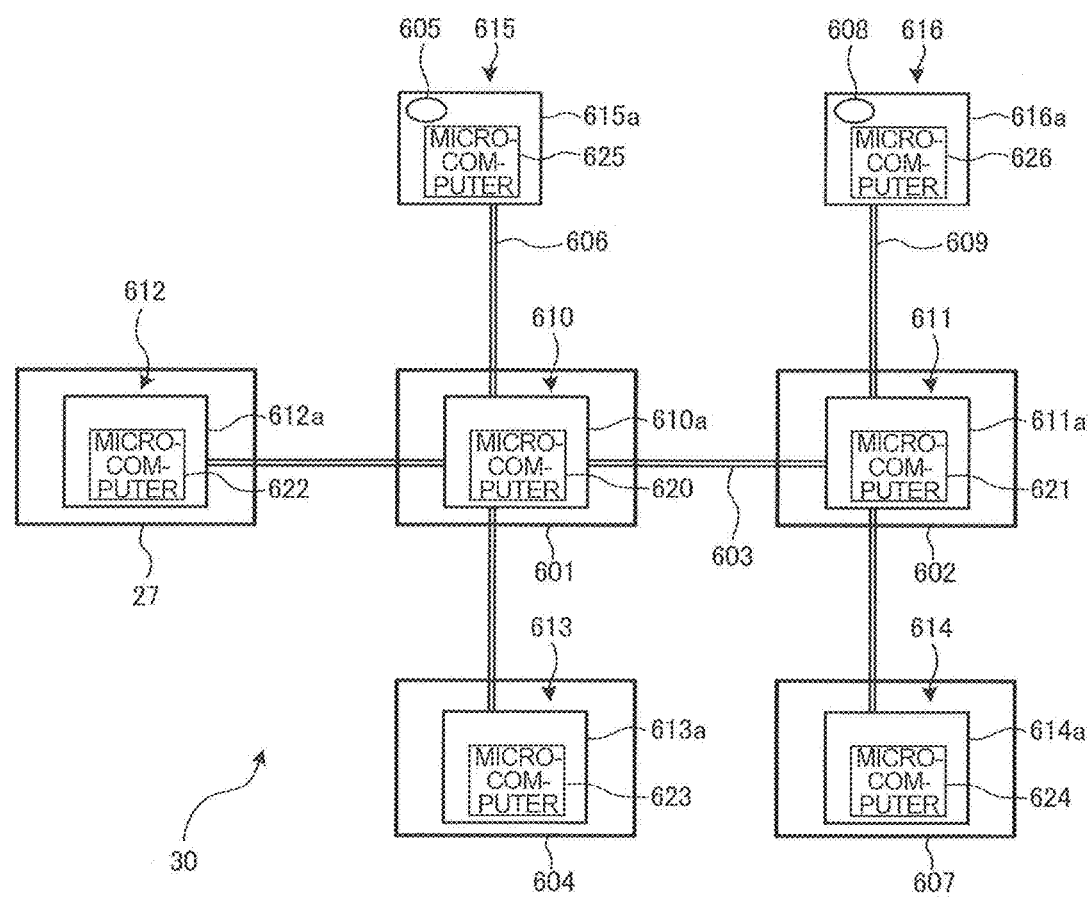
FIG. 11 is a block diagram for illustrating a configuration of a controller 30 of the refrigeration cycle system according to the fifth embodiment of the present invention.

FIG. 11 is a block diagram for illustrating a configuration of the controller 30 of the refrigeration cycle system according to the fifth embodiment. As illustrated in FIG. 11, the controller 30 includes an indoor unit controller 610 mounted to the indoor unit 601 and configured to control the indoor unit 601, an outdoor unit controller 611 mounted to the outdoor unit 602 and configured to control the outdoor unit 602, and a remote controller control unit 612 mounted to the remote controller 27 (for example, operation unit provided in the indoor unit 601) and configured to control the remote controller 27.

The indoor unit controller 610 is communicably connected to the outdoor unit controller 611 and the remote controller control unit 612 through the respective control lines. The indoor unit controller 610 includes a control board 610*a*. A microcomputer 620 is mounted on the control board 610*a*.

The outdoor unit controller 611 includes a control board 611*a*. A microcomputer 621 is mounted on the control board 611*a*.

The remote controller control unit 612 includes a control board 612*a*. A microcomputer 622 is mounted on the control board 612*a*.

Further, an air-sending fan controller 613 configured to control the air-sending fan 604 is mounted to the air-sending fan 604 of the fifth embodiment. An air-sending fan controller 614 configured to control the air-sending fan 607 is mounted to the air-sending fan 607 of the fifth embodiment.

The air-sending fan controller 613 is communicably connected to the indoor unit controller 610 through the control line. The air-sending fan controller 613 includes a control board 613*a*. A microcomputer 623 is mounted on the control board 613*a*.

The air-sending fan controller 614 is communicably connected to the outdoor unit controller 611 through the control line. The air-sending fan controller 614 includes a control board 614*a*. A microcomputer 624 is mounted on the control board 614*a*.

Further, the controller 30 includes a sensor controller 615 configured to control the refrigerant detection unit 605 and a sensor controller 616 configured to control the refrigerant detection unit 608.

The sensor controller 615 is communicably connected to the indoor unit controller 610. The sensor controller 615 includes a control board 615*a*. A microcomputer 625 and the refrigerant detection unit 605 are unremovably mounted on the control board 615*a*. The refrigerant detection unit 605 of the fifth embodiment is directly mounted on the control board 615*a*, but it suffices that the refrigerant detection unit 605 is unremovably connected to the control board 615*a*. For example, the refrigerant detection unit 605 may be provided in a position distant from the control board 615*a*, and a wiring extending from the refrigerant detection unit 605 may be connected to the control board 615*a* by soldering or other ways. Further, in the fifth embodiment, the control board 615*a* is provided separately from the control board 610*a*, but the control board 615*a* may be omitted, and the refrigerant detection unit 605 may be unremovably connected to the control board 610*a*.

The sensor controller 616 is communicably connected to the outdoor unit controller 611. The sensor controller 616 includes a control board 616*a*. A microcomputer 626 and the refrigerant detection unit 608 are unremovably mounted on the control board 616*a*. The refrigerant detection unit 608 of the fifth embodiment is mounted directly on the control board 616*a*, but it suffices that the refrigerant detection unit 608 is unremovably connected to the control board 616*a*. For example, the refrigerant detection unit 608 may be provided in a position distant from the control board 616*a*, and a wiring extending from the refrigerant detection unit 608 may be connected to the control board 616*a* by soldering or other ways. Further, in the fifth embodiment, the control board 616*a* is provided separately from the control board 611*a*, but the control board 616*a* may be omitted, and the refrigerant detection unit 608 may be unremovably connected to the control board 611*a*.

The microcomputers 625 and 626 of the sensor controllers 615 and 616 each include a rewritable nonvolatile memory. Each nonvolatile memory is provided with a leakage history bit (one example of a leakage history storage area) for storing a history of the refrigerant leakage. The leakage history bit can be set to "0" or "1", As the leakage history bit, "0" indicates a state of having no refrigerant leakage history, and "1" indicates a state of having a refrigerant leakage history. The leakage history bit has an initial value of "0". That is, in a case of the microcomputers 625 and 626 in brand-new conditions or the microcomputers 625 and 626 having no refrigerant leakage history, the leakage history bit is set to "0". The leakage history bit of the microcomputer 625 is rewritten from "0" to "1" when the refrigerant detection unit 605 detects the leakage of the refrigerant. When the refrigerant detection unit 608 detects the leakage of the refrigerant, the leakage history bit of the microcomputer 626 is rewritten from "0" to "1". Both the leakage history bits of the microcomputers 625 and 626 can be rewritten from "0" to "1" irreversibly only in one way. Further, the leakage history bits of the microcomputers 625 and 626 are maintained irrespective of the presence or absence of electric power supply to the microcomputers 625 and 626.

Memories of the microcomputers 620, 621, and 622 of the indoor unit 601, the outdoor unit 602, and the remote controller 27 are each provided with a first leakage history bit corresponding to the leakage history bit of the microcomputer 625 and a second leakage history bit corresponding to the leakage history bit of the microcomputer 626. These leakage history bits can be set to "0" or "1", and can be rewritten in both ways between "0" and "1". The first leakage history bit of each of the microcomputers 620, 621, and 622 has a value set to the same value as that of the leakage history bit of the microcomputer 625 acquired through communications. The second leakage history bit of each of the microcomputers 620, 621, and 622 has a value set to the same value as that of the leakage history bit of the microcomputer 626 acquired through communications. Even when returning to the initial value (for example, "0") due to an interruption of the electric power supply, the first leakage history bits and the second leakage history bits of the microcomputers 620, 621, and 622 are set to the same value as these of the leakage history bits of the microcomputers 625 and 626 again when the electric power supply is restarted.

When both the first leakage history bit and the second leakage history bit of the microcomputer 620 are set to "0", the indoor unit controller 610 normally controls the indoor unit 601. The indoor unit 601 in this state conducts and stops the operation in a normal state in accordance with the operation through the remote controller 27. When the first leakage history bit of the microcomputer 620 is set to "1", the indoor unit controller 610 conducts, for example, control for forcedly operating the air-sending fan 604 via the air-sending fan controller 613.

When both the first leakage history bit and the second leakage history bit of the microcomputer 621 are set to "0", the outdoor unit controller 611 normally controls the outdoor unit 602. When the first leakage history bit or the second leakage history bit of the microcomputer 621 is set to "1", the outdoor unit controller 611 conducts, for example, control for stopping the compressor 3. The stoppage of the compressor 3 is continued as long as the first leakage history bit or the second leakage history bit of the microcomputer 621 is set to "1". Further, when the second leakage history bit of the microcomputer 621 is set to "1", the outdoor unit controller 611 conducts, for example, control for forcedly operating the air-sending fan 607 via the air-sending fan controller 614. At this time, the outdoor unit controller 611 may also conduct control for forcedly operating the outdoor air-sending fan 5f.

When both the first leakage history bit and the second leakage history bit of the microcomputer 622 are set to "0", the remote controller control unit 612 normally controls the remote controller 27. When the first leakage history bit or the second leakage history bit of the microcomputer 622 is set to "1", the remote controller control unit 612 displays, for example, information including the abnormality type or the abnormality handling method on the display unit provided to the remote controller 27. At this time, the remote controller control unit 612 may display information on the refrigerant leakage point on the display unit on the basis of which one of the first leakage history bit and the second leakage history bit is set to "1". For example, when the first leakage history bit is set to "1", information indicating that the leakage of the refrigerant has occurred in the indoor unit 601 is displayed, and when the second leakage history bit is set to "1", information indicating that the leakage of the refrigerant has occurred in the outdoor unit 602 is displayed. Further, the remote controller control unit 612 may be configured to cause the audio output unit provided to the remote controller 27 to output the notification on the abnormality type, the abnormality handling method, or the refrigerant leakage point by voice.

According to the fifth embodiment, the leakage history of the refrigerant is written to the nonvolatile memories of the control boards 615a and 616a irreversibly. To reset the leakage history of the refrigerant, the control boards 615a and 616a need to be replaced by other control boards having no leakage history. When the control boards 615a and 616a are replaced, the refrigerant detection units 605 and 608 unremovably connected to the control boards 615a and 616a are also replaced. Hence, the refrigerant detection units 605 and 608 exposed to the refrigerant atmosphere to have changed detection characteristics can be prevented from being kept in continuous use. Further, in the fifth embodiment, the operation of the showcase cannot be restarted unless the control boards 615a and 616a are replaced, and hence the operation of the showcase that has not been repaired at the refrigerant leakage point can be prevented from being restarted due to a human error or intentionally.

Further, in the fifth embodiment, when the integrated time of electric supply to the refrigerant detection unit 605 becomes equal to or larger than the threshold value H1, it is determined that the refrigerant detection unit 605 has come to its end of life, and the notifier outputs the notification of the abnormality. Further, in the fifth embodiment, when the integrated time of electric supply to the refrigerant detection unit 608 becomes equal to or larger than the threshold value H1, it is determined that the refrigerant detection unit 608 has come to its end of life, and the notifier outputs the notification of the abnormality. Hence, according to the fifth embodiment, the user or others can be prompted about replacement of the refrigerant detection units 605 and 608, and hence the refrigerant detection units 605 and 608 whose detection characteristics have been changed can be prevented from being kept in continuous use.

In the fifth embodiment, only the memories of the microcomputers 620, 621, and 622 of the indoor unit 601, the outdoor unit 602, and the remote controller 27 are provided with the first leakage history bit and the second leakage history bit, but the memories of the microcomputers 623 and 624 of the air-sending fans 604 and 607 may also be provided with the first leakage history bit and the second leakage history bit.

Further, in the fifth embodiment, the air-sending fans 604 and 607 include the air-sending fan controllers 613 and 614, respectively, and hence the air-sending fan 604 and the indoor unit 601 as well as the air-sending fan 607 and the outdoor unit 602 are connected to each other through the respective control lines. However, the air-sending fans 604 and 607 do not necessarily include the controller. When the air-sending fans 604 and 607 do not include the controller, for example, the air-sending fan 604 and the indoor unit 601 as well as the air-sending fan 607 and the outdoor unit 602 are connected to each other through a power supply line. In this case, the operation and stoppage of the air-sending fan 604 are controlled by a relay of the control board 610*a* of the indoor unit controller 610, and the operation and stoppage of the air-sending fan 607 are controlled by a relay of a control board 611*a* of the outdoor unit controller 611.

Further, in the fifth embodiment, the leakage history bit, which stores the presence or absence of the leakage history by 1 bit, is exemplified as the leakage history storage area provided to the nonvolatile memory, but the present invention is not limited to this configuration. The nonvolatile memory may be provided with, for example, the leakage history storage area having equal to or larger than 2 bits. The leakage history storage area selectively stores any one of first information indicating the state of having no refrigerant leakage history and second information indicating the state of having a refrigerant leakage history. Further, the information stored in the leakage history storage area can be changed from the first information to the second information only in one way. The controller 30 (for example, sensor controllers 615 and 616) is configured to change the information stored in the leakage history storage area from the first information to the second information when detecting the leakage of the refrigerant.

As described in the fifth embodiment, the refrigerant detection unit or the air-sending fan is not necessarily built into the casing of the indoor unit or the outdoor unit of the refrigeration cycle apparatus. The refrigerant detection unit and the air-sending fan may be provided separately from the refrigeration cycle apparatus as long as the refrigerant detection unit and the air-sending fan are communicably connected to the refrigeration cycle apparatus through the control line or other ways, or are connected to the refrigeration cycle apparatus in a remotely controllable manner through the power supply line.

Further, as described in the fifth embodiment, when the refrigerant detection unit and the air-sending fan are installed at each of the installation position of the indoor unit and the installation position of the outdoor unit, only the air-sending fan in the space in which the leakage of the refrigerant is detected may be operated. That is, when the leakage of the refrigerant is detected by the refrigerant detection unit provided at the installation position of the indoor unit, only the air-sending fan provided at the installation position of the indoor unit may be operated. When the leakage of the refrigerant is detected by the refrigerant detection unit provided at the installation position of the outdoor unit, only the air-sending fan provided at the installation position of the outdoor unit may be operated.

Further, in the fifth embodiment, the air-sending fan 604 configured to stir the air in the indoor space is provided in the indoor space, and the air-sending fan 607 for ventilation configured to deliver the air in the machine room space to the outdoor space is provided in the machine room space, but the present invention is not limited to this configuration. For example, an air-sending fan for ventilation configured to deliver the air in the indoor space to the outdoor space may be provided in the indoor space, or an air-sending fan configured to stir the air in the machine room space may be provided in the machine room space.

As described above, the refrigeration cycle apparatus according to the above-mentioned embodiments includes the refrigerant circuit 40 configured to circulate refrigerant, the heat exchanger unit (for example, indoor unit 1 or outdoor unit 2) accommodating the heat exchanger (for example, load-side heat exchanger 7 or heat source-side heat exchanger 5) of the refrigerant circuit 40, and the controller 30 configured to control the heat exchanger unit. The heat exchanger unit includes the air-sending fan (for example, indoor air-sending fan 7*f* or outdoor air-sending fan 5*f*), the electric supply-type refrigerant detection unit (for example, refrigerant detection unit 98 or 99), and the notifier (for example, notifier provided in the operation unit 26) configured to output the notification of the abnormality. The controller 30 is configured to stop electric supply to the refrigerant detection unit when the electric supply stop condition is satisfied under the state in which the refrigerant detection unit is supplied with electricity, supply electricity to the refrigerant detection unit when the electric supply condition is satisfied under the state in which the electric supply to the refrigerant detection unit is stopped, and cause the notifier to output the notification of the abnormality when the integrated time of electric supply to the refrigerant detection unit becomes equal to or larger than the threshold value H1.

According to this configuration, the user or others can be prompted about replacement of the refrigerant detection unit when the integrated time of electric supply to the refrigerant detection unit becomes equal to or larger than the threshold value H1, and hence the refrigerant detection unit whose detection characteristics have been changed can be prevented from being kept in continuous use.

Further, in the refrigeration cycle apparatus according to the above-mentioned embodiments, the controller 30 may be configured to stop the compressor 3 of the refrigerant circuit 40 when the integrated time of electric supply becomes equal to or larger than the threshold value H1.

Further, in the refrigeration cycle apparatus according to the above-mentioned embodiments, the controller 30 may be configured to operate the air-sending fan when the integrated time of electric supply becomes equal to or larger than the threshold value H1 (for example, operate the indoor air-sending fan 7*f* when the integrated time of electric supply to the refrigerant detection unit 99 becomes equal to or larger than the threshold value H1, and operate the outdoor air-sending fan 5*f* when the integrated time of electric supply to the refrigerant detection unit 98 becomes equal to or larger than the threshold value H1).

Further, in the refrigeration cycle apparatus according to the above-mentioned embodiments, the electric supply stop condition may be the condition in which the rotation speed of the air-sending fan becomes equal to or larger than the first threshold rotation speed (for example, threshold value R1 of the first embodiment or threshold value R2 of the second embodiment), and the electric supply condition may be the condition in which the rotation speed of the air-sending fan becomes smaller than the second threshold rotation speed (for example, threshold value R1 of the first and second embodiments). The second threshold rotation speed may be equal to or smaller than the first threshold rotation speed.

Further, in the refrigeration cycle apparatus according to the above-mentioned embodiments, the controller 30 may be configured to operate the air-sending fan when the controller 30 detects leakage of the refrigerant on the basis of the detection signal from the refrigerant detection unit.

Further, in the refrigeration cycle apparatus according to the above-mentioned embodiments, the controller 30 may be configured to cause the notifier to output the notification of the advance notice of the abnormality when the integrated time of electric supply becomes equal to or larger than the second threshold time, which is smaller than the first threshold time.

Further, in the refrigeration cycle apparatus according to the above-mentioned embodiments, the controller 30 may be configured to select whether or not to cause the notifier to output the notification of the advance notice of the abnormality.

Further, the refrigeration cycle apparatus according to the above-mentioned embodiments includes the refrigerant circuit 40 configured to circulate refrigerant, the heat exchanger unit (for example, indoor unit 1 or outdoor unit 2) accommodating the heat exchanger of the refrigerant circuit 40, and the controller 30 configured to control the heat exchanger unit. The heat exchanger unit includes the electric supply-type refrigerant detection unit (for example, refrigerant detection unit 98 or 99). The controller 30 includes the control board 31*b* to which the refrigerant detection unit is unremovably connected, and the nonvolatile memory (for example, nonvolatile memory included in the microcomputer 35) provided on the control board 31*b*. The nonvolatile memory is provided with the abnormality history storage area for storing any one of the first information (for example, abnormality history bit (end-of-life bit) of "0") indicating the state in which the refrigerant detection unit has no abnormality history (for example, the state in which the refrigerant detection unit has not come to its end of life) and the second information (for example, abnormality history bit (end-of-life bit) of "1") indicating the state in which the refrigerant detection unit has an abnormality history (for example, the state in which the refrigerant detection unit has come to its end of life). In the abnormality history storage area, the first information is allowed to be changed to the second information only in one way. The controller 30 is configured to change the information stored in the abnormality history storage area from the first information to the second information when the integrated time of electric supply to the refrigerant detection unit becomes equal to or larger than the threshold value H1.

Further, in the refrigeration cycle apparatus according to the above-mentioned embodiments, the second information may be information indicating the end of life of the refrigerant detection unit.

Further, in the refrigeration cycle apparatus according to the above-mentioned embodiments, the second information may be information indicating the advance notice of the end of life of the refrigerant detection unit.

Further, in the refrigeration cycle apparatus according to the above-mentioned embodiments, the heat exchanger unit may further include the notifier (for example, notifier provided in the operation unit 26), and the controller 30 may be configured to cause the notifier to output the notification of the abnormality when the information stored in the abnormality history storage area is changed to the second information.

Further, in the refrigeration cycle apparatus according to the above-mentioned embodiments, the heat exchanger unit may further include the notifier (for example, notifier provided in the operation unit 26), and the controller 30 may be configured to cause the notifier to output the notification of the abnormality when the information stored in the abnormality history storage area is changed to the second information. The controller 30 may be configured to select whether or not to cause the notifier to output the notification of the abnormality.

Further, in the refrigeration cycle apparatus according to the above-mentioned embodiments, the heat exchanger may be the load-side heat exchanger 7 or the heat source-side heat exchanger 5 of the refrigerant circuit 40.

Further, the refrigeration cycle system according to the above-mentioned embodiments includes the refrigeration cycle apparatus including the refrigerant circuit 40 configured to circulate refrigerant, the controller 30 configured to control the refrigerant circuit 40, and the notifier (for example, notifier provided in the operation unit 26 or notifier provided in the remote controller 27) configured to output the notification of the abnormality, and the electric supply-type refrigerant detection unit (for example, refrigerant detection unit 605 or 608) configured to output a detection signal to the controller 30. The controller 30 is configured to stop electric supply to the refrigerant detection unit when the electric supply stop condition is satisfied under the state in which the refrigerant detection unit is supplied with electricity, supply electricity to the refrigerant detection unit when the electric supply condition is satisfied under the state in which the electric supply to the refrigerant detection unit is stopped, and cause the notifier to output the notification of the abnormality when the integrated time of electric supply to the refrigerant detection unit becomes equal to or larger than the threshold value H1.

Further, the refrigeration cycle system according to the above-mentioned embodiments may further include the air-sending fan (for example, air-sending fan 604 or 607), in which the electric supply stop condition may be the condition in which the rotation speed of the air-sending fan becomes equal to or larger than the first threshold rotation speed (for example, threshold value R1 of the first embodiment or threshold value R2 of the second embodiment), the electric supply condition may be the condition in which the rotation speed of the air-sending fan becomes smaller than the second threshold rotation speed (for example, threshold value R1 of the first and second embodiments), and the second threshold rotation speed may be equal to or smaller than the first threshold rotation speed.

Further, the refrigeration cycle system according to the above-mentioned embodiments may further include the air-sending fan (for example, air-sending fan 604 or 607), in which the controller 30 may be configured to operate the air-sending fan when the controller 30 detects leakage of the refrigerant on the basis of the detection signal from the refrigerant detection unit.

Further, in the refrigeration cycle system according to the above-mentioned embodiments, the controller 30 may be configured to cause the notifier to output the notification of the advance notice of the abnormality when the integrated time of electric supply becomes equal to or larger than the second threshold time, which is smaller than the first threshold time.

Further, in the refrigeration cycle system according to the above-mentioned embodiments, the controller 30 may be configured to select whether or not to cause the notifier to output the notification of the advance notice of the abnormality.

Further, the refrigeration cycle system according to the above-mentioned embodiments includes the refrigeration cycle apparatus including the refrigerant circuit 40 configured to circulate refrigerant, and the controller 30 configured to control the refrigerant circuit 40, and the electric supply-type refrigerant detection unit (for example, refrigerant detection unit 605 or 608) configured to output a detection signal to the controller 30. The controller 30 includes the control board (for example, control board 615*a* or 616*a*) to which the refrigerant detection unit is unremovably connected, and the nonvolatile memory (for example, nonvolatile memory included in the microcomputer 625 or 626) provided on the control board. The nonvolatile memory is provided with the abnormality history storage area for storing any one of the first information (for example, abnormality history bit (end-of-life bit) of "0") indicating the state in which the refrigerant detection unit has no abnormality history (for example, the state in which the refrigerant detection unit has not come to its end of life) and the second information (for example, abnormality history bit (end-of-life bit) of "1") indicating the state in which the refrigerant detection unit has an abnormality history (for example, the state in which the refrigerant detection unit has come to its end of life). In the abnormality history storage area, the first information is allowed to be changed to the second information only in one way. The controller 30 is configured to change the information stored in the abnormality history storage area from the first information to the second information when the integrated time of electric supply to the refrigerant detection unit becomes equal to or larger than the threshold value H1.

Further, in the refrigeration cycle system according to the above-mentioned embodiments, the second information may be information indicating the end of life of the refrigerant detection unit.

Further, in the refrigeration cycle system according to the above-mentioned embodiments, the second information may be information indicating the advance notice of the end of life of the refrigerant detection unit.

Further, in the refrigeration cycle system according to the above-mentioned embodiments, the refrigeration cycle apparatus may further include the heat exchanger unit (for example, indoor unit 1 or outdoor unit 2) accommodating the heat exchanger of the refrigerant circuit 40, and the heat exchanger unit may further include the notifier. The controller 30 may be configured to cause the notifier to output the notification of the abnormality when the information stored in the abnormality history storage area is changed to the second information.

Further, in the refrigeration cycle system according to the above-mentioned embodiments, the refrigeration cycle apparatus may further include the heat exchanger unit (for example, indoor unit 1 or outdoor unit 2) accommodating the heat exchanger of the refrigerant circuit 40, and the heat exchanger unit may further include the notifier. The controller 30 may be configured to cause the notifier to output the notification of the abnormality when the information stored in the abnormality history storage area is changed to the second information. The controller 30 may be configured to select whether or not to cause the notifier to output the notification of the abnormality.

Other Embodiments

The present invention is not limited to the above-mentioned embodiments, and various modifications may be made to the embodiments.

For example, in the above-mentioned embodiments, the indoor unit 1 is exemplified by an indoor unit of a floor type, but the present invention can be applied to other indoor units of, for example, a ceiling-mounted cassette type, a ceiling-concealed type, a ceiling-suspended type, and a wall-hung type.

Further, in the above-mentioned embodiments, the electric supply stop condition is exemplified by the situation where the rotation speed of the indoor air-sending fan 7f becomes equal to or larger than the first threshold rotation speed, and the electric supply condition is exemplified by the situation where the rotation speed of the indoor air-sending fan 7f becomes smaller than the second threshold rotation speed, but conditions other than the rotation speed of the indoor air-sending fan 7f may be used as the electric supply stop condition and the electric supply condition. During the normal operation of the indoor unit 1, there are a state in which the refrigerant detection unit 99 is supplied with electricity and a state in which the electric supply to the refrigerant detection unit is stopped.

Further, in the above-mentioned embodiments, the refrigeration cycle apparatus is exemplified by the air-conditioning apparatus. However, the present invention can also be applied to other refrigeration cycle apparatus such as a heat pump water heater.

Further, in the above-mentioned embodiments, the refrigerant detection unit is exemplified by the semiconductor gas sensor and the hot-wire type semiconductor gas sensor, but the present invention is not limited to this configuration. As the refrigerant detection unit, for example, an infrared refrigerant detection unit or other refrigerant detection units can be used as long as the refrigerant detection unit is of an electric supply type.

Further, the above-mentioned embodiments and modification examples may be implemented in combinations.

REFERENCE SIGNS LIST 1 indoor unit 2 outdoor unit 3 compressor 4 refrigerant flow switching device 5 heat source-side heat exchanger 5f outdoor air-sending fan 6 pressure reducing device 7 load-side heat exchanger 7f indoor air-sending fan 9a, 9b indoor pipe 10a, 10b extension pipe 11 suction pipe 12 discharge pipe 13a, 13b extension pipe connecting valve 14a, 14b, 14c service port 15a, 15b, 16a, 16b joint portion 20 partition portion 20a air passage opening part 25 electric component box 26 operation unit 27 remote controller 30 controller 31 indoor unit controller 31a, 31b control board 32 outdoor unit controller 32a control board 33 operation unit controller 33a control board 34, 35, 36, 37 microcomputer 38, 39 control line 40 refrigerant circuit 81 air passage 91 suction air temperature sensor 92 heat exchanger entrance temperature sensor 93 heat exchanger temperature sensor 98, 99 refrigerant detection unit 107 impeller 108 fan casing 108a air outlet opening part 108b suction opening part 111 casing 112 air inlet 113 air outlet 114a first front panel 114b second front panel 114c third front panel 115a, 115b space 601 indoor unit 602 outdoor unit 603 control line 604 air-sending fan 605 refrigerant detection unit 606 communication line 607 air-sending fan 608 refrigerant detection unit 609 communication line 610 indoor unit controller 610a control board 611 outdoor unit controller 611a control board 612 remote controller control unit 612a control board 613, 614 air-sending fan controller 613a, 614a control board 615, 616 sensor controller 615a, 616a control board 620, 621, 622, 623, 624, 625, 626 microcomputer

The invention claimed is:

1. A refrigeration cycle apparatus, comprising:
a refrigerant circuit configured to circulate refrigerant;
a heat exchanger unit accommodating a heat exchanger of the refrigerant circuit; and
a controller configured to control the heat exchanger unit,
the heat exchanger unit including
an air-sending fan,
an electric refrigerant detection sensor, and
a notifier configured to output notification of an abnormality,
the controller is configured to
stop electric supply to the electric refrigerant detection sensor in response to an electric supply stop condition being satisfied under a state in which the electric refrigerant detection sensor is supplied with electricity, supply electricity to the electric refrigerant detection sensor in response to an electric supply condition being satisfied under a state in which the electric supply to the electric refrigerant detection sensor is stopped, and cause the notifier to output the notification of the abnormality and operate the air-sending fan in response to an integrated time of electric supply to the electric refrigerant detection unit becoming equal to or larger than a first threshold time; and the electric supply stop condition including a condition in which a rotation speed of the air-sending fan becomes equal to or larger than a first threshold rotation speed, the electric supply condition including a condition in which the rotation speed of the air-sending fan becomes smaller than a second threshold rotation speed, and the second threshold rotation speed being equal to or smaller than the first threshold rotation speed.

2. The refrigeration cycle apparatus of claim 1, wherein the controller is configured to stop a compressor of the refrigerant circuit in response to the integrated time of electric supply becoming equal to or larger than the first threshold time.

3. The refrigeration cycle apparatus of claim 1, wherein the controller is configured to operate the air-sending fan in response to the controller detecting leakage of the refrigerant on a basis of a detection signal from the electric refrigerant detection sensor.

4. The refrigeration cycle apparatus of claim 1, wherein the controller is configured to cause the notifier to output a notification of an advance notice of the abnormality in response to the integrated time of electric supply becoming equal to or larger than a second threshold time that is smaller than the first threshold time.

5. The refrigeration cycle apparatus of claim 4, wherein the controller is configured to select whether or not to cause the notifier to output the notification of the advance notice of the abnormality.

6. The refrigeration cycle apparatus of claim 1,
the controller including
a control board to which the electric refrigerant detection sensor is connected, and
a nonvolatile memory provided on the control board,
the nonvolatile memory being provided with an abnormality history storage area for storing any one of first information indicating a state in which the electric refrigerant detection sensor has no abnormality history and second information indicating a state in which the electric refrigerant detection sensor has an abnormality history,
in the abnormality history storage area, the first information is allowed to be changed to the second information only in one way,
the controller being configured to change the information stored in the abnormality history storage area from the first information to the second information in response to the integrated time of electric supply becoming equal to or larger than the first threshold time or equal to or larger than a second threshold time that is smaller than the first threshold time.

7. The refrigeration cycle apparatus of claim 6, wherein the second information includes information indicating an end of life of the electric refrigerant detection sensor.

8. The refrigeration cycle apparatus of claim 6, wherein the second information includes information indicating an advance notice of an end of life of the electric refrigerant detection sensor.

9. The refrigeration cycle apparatus of
claim 6, wherein the controller is configured to cause the notifier to output the notification of the abnormality in response to the information stored in the abnormality history storage area being changed to the second information.

10. The refrigeration cycle apparatus of claim 8, wherein
the controller is configured to cause the notifier to output the notification of the abnormality in response to the information stored in the abnormality history storage area being changed to the second information, and
the controller is configured to select whether or not to cause the notifier to output the notification of the abnormality.

11. The refrigeration cycle apparatus of claim 1, wherein the heat exchanger includes a load-side heat exchanger of the refrigerant circuit.

12. The refrigeration cycle apparatus of claim 1, wherein the heat exchanger includes a heat source-side heat exchanger of the refrigerant circuit.

13. A refrigeration cycle system, comprising:
a refrigeration cycle apparatus including
a refrigerant circuit configured to circulate refrigerant,
a controller configured to control the refrigerant circuit, and
a notifier configured to output notification of an abnormality;
an electric refrigerant detection sensor, the electric refrigerant detection unit being configured to output a detection signal to the controller; and
an air-sending fan,
the controller being configured to
stop electric supply to the electric refrigerant detection sensor in response to an electric supply stop condition being satisfied under a state in which the electric refrigerant detection sensor is supplied with electricity,
supply electricity to the electric refrigerant detection sensor in response to an electric supply condition being satisfied under a state in which the electric supply to the electric refrigerant detection sensor is stopped, and
cause the notifier to output the notification of the abnormality in response to an integrated time of electric supply to the electric refrigerant detection sensor becoming equal to or larger than a first threshold time,
the electric supply stop condition including a condition in which a rotation speed of the air-sending fan becomes equal to or larger than a first threshold rotation speed,
the electric supply condition including a condition in which the rotation speed of the air-sending fan becomes smaller than a second threshold rotation speed,
the second threshold rotation speed being equal to or smaller than the first threshold rotation speed.

14. The refrigeration cycle system of claim 13, wherein the controller is configured to cause the notifier to output the notification of an advance notice of the abnormality in response to the integrated time of electric supply becoming equal to or larger than a second threshold time that is smaller than the first threshold time.

15. The refrigeration cycle system of claim 14, wherein the controller is configured to select whether or not to cause the notifier to output the notification of the advance notice of the abnormality.

16. The refrigeration cycle system of claim 13, the controller including
a control board to which the electric refrigerant detection sensor is unremovably connected, and
a nonvolatile memory provided on the control board,
the nonvolatile memory being provided with an abnormality history storage area for storing any one of first information indicating a state in which the electric refrigerant detection unit has no abnormality history and second information indicating a state in which the electric refrigerant detection sensor has an abnormality history,
in the abnormality history storage area, the first information is allowed to be changed to the second information only in one way,
the controller being configured to change the information stored in the abnormality history storage area from the first information to the second information in response to the integrated time of electric supply becoming equal to or larger than the first threshold time or equal to or larger than a second threshold time that is smaller than the first threshold time.

17. The refrigeration cycle system of claim 16, wherein the second information includes information indicating an end of life of the electric refrigerant detection sensor.

18. The refrigeration cycle system of claim 16 wherein the second information includes information indicating an advance notice of an end of life of the electric refrigerant detection sensor.

19. The refrigeration cycle system of claim 16, wherein the controller is configured to cause the notifier to output the notification of the abnormality in response to the information stored in the abnormality history storage area being changed to the second information.

20. The refrigeration cycle system of claim 18, wherein
the controller is configured to cause the notifier to output the notification of the abnormality in response to the information stored in the abnormality history storage area being changed to the second information; and
the controller is configured to select whether or not to cause the notifier to output the notification of the abnormality.

21. A refrigeration cycle apparatus, comprising:
a refrigerant circuit configured to circulate refrigerant;
a heat exchanger unit accommodating a heat exchanger of the refrigerant circuit; and
a controller configured to control the heat exchanger unit,
the heat exchanger unit including
an air-sending fan,
an electric refrigerant detection sensor, and
a notifier configured to output notification of an abnormality,
the controller is configured to
stop electric supply to the electric refrigerant detection sensor
in response to an electric supply stop condition being satisfied under a state in which the electric refrigerant detection sensor is supplied with electricity,
supply electricity to the electric refrigerant detection sensor in response to an electric supply condition being satisfied under a state in which the electric supply to the electric refrigerant detection sensor is stopped, and
cause the notifier to output the notification of the abnormality in response to an integrated time of electric supply to the electric refrigerant detection unit becoming equal to or larger than a first threshold time,
the electric supply stop condition including a condition in which a rotation speed of the air-sending fan becomes equal to or larger than a first threshold rotation speed,
the electric supply condition including a condition in which the rotation speed of the air-sending fan becomes smaller than a second threshold rotation speed,
the second threshold rotation speed being equal to or smaller than the first threshold rotation speed.

22. The refrigeration cycle apparatus of claim 1, wherein the notification of the abnormality comprising notification prompting replacement of the electric refrigerant detection sensor.

23. A refrigeration cycle apparatus, comprising:
a refrigerant circuit configured to circulate refrigerant;
a heat exchanger unit accommodating a heat exchanger of the refrigerant circuit; and
a controller configured to control the heat exchanger unit,
the heat exchanger unit including
an air-sending fan, and
an electric refrigerant detection sensor,
the controller being configured to operate the air-sending fan in response to the controller detecting leakage
of the refrigerant on a basis of a detection signal from the electric refrigerant detection sensor,
the controller is configured to stop electric supply to the electric refrigerant detection sensor in response to the rotation speed of the air-sending fan becoming equal to or larger than a first threshold rotation speed under a state in which the electric refrigerant detection sensor is supplied with electricity.

24. The refrigeration cycle apparatus of claim 23, wherein
the controller is configured to supply electricity to the electric refrigerant detection sensor in response to the rotation speed of the air-sending fan becoming smaller than a second threshold rotation speed under a state in which the electric supply to the electric refrigerant detection sensor is stopped, and
the second threshold rotation speed is equal to or smaller than the first threshold rotation speed.

25. A refrigeration cycle system, comprising:
a refrigeration cycle apparatus including
a refrigerant circuit configured to circulate refrigerant,
a controller configured to control the refrigerant circuit, and
a notifier configured to output notification of an abnormality;
an electric refrigerant detection unit, the electric refrigerant detection sensor being configured to output a detection signal to the controller; and
an air-sending fan,
the controller being configured to
stop electric supply to the electric refrigerant detection sensor in response to an electric supply stop condition being satisfied under a state in which the electric refrigerant detection sensor is supplied with electricity,
supply electricity to the electric refrigerant detection sensor in response to an electric supply condition being satisfied under a state in which the electric supply to the electric refrigerant detection sensor is stopped, and cause the notifier to output the notification of the abnormality in response to an integrated time of electric supply to the electric refrigerant detection sensor becoming equal to or larger than a first threshold time, the controller being configured to operate the air-sending fan in response to the controller detecting leakage of the refrigerant on a basis of the detection signal from the electric refrigerant detection sensor, and the electric supply stop condition including a condition in which a rotation speed of the air-sending fan becomes equal to or larger than a first threshold rotation speed, the electric supply condition including a condition in which the rotation speed of the air-sending fan becomes smaller than a second threshold rotation speed, and the second threshold rotation speed being equal to or smaller than the first threshold rotation speed.

26. The refrigeration cycle system of claim 13, wherein the notification of the abnormality comprising notification prompting replacement of the electric refrigerant detection sensor.

27. A refrigeration cycle system, comprising:
a refrigeration cycle apparatus including
a refrigerant circuit configured to circulate refrigerant, and
a controller configured to control the refrigerant circuit,
an air-sending fan configured to be controlled by the controller; and
an electric refrigerant detection sensor, the electric refrigerant detection unit being configured to output a detection signal to the controller,
the controller being configured to operate the air-sending fan in response to the controller detecting leakage of the refrigerant on a basis of the detection signal from the electric refrigerant detection sensor,
the controller being configured to stop electric supply to the electric refrigerant detection sensor in response to a rotation speed of the air-sending fan becoming equal to or larger than a first threshold rotation speed under a state in which the electric refrigerant detection sensor is supplied with electricity.

28. The refrigeration cycle system of claim 27, wherein the controller is configured to supply electricity to the electric refrigerant detection sensor in response to the rotation speed of the air-sending fan becoming smaller than a second threshold rotation speed under a state in which the electric supply to the electric refrigerant detection sensor is stopped, and
the second threshold rotation speed is equal to or smaller than the first threshold rotation speed.

* * * * *